(12) United States Patent (10) Patent No.: US 12,578,222 B2

Yamada (45) Date of Patent: Mar. 17, 2026

(54) LASER INTERFEROMETER

(71) Applicant: SEIKO EPSON CORPORATION, Tokyo (JP)

(72) Inventor: Kohei Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 433 days.

(21) Appl. No.: 18/169,937

(22) Filed: Feb. 16, 2023

(65) Prior Publication Data

US 2023/0266161 A1 Aug. 24, 2023

(30) Foreign Application Priority Data

Feb. 18, 2022 (JP) ................................. 2022-023681

(51) Int. Cl.
 G01B 9/02055 (2022.01)
 G01H 9/00 (2006.01)
(52) U.S. Cl.
 CPC ..................................... G01H 9/00 (2013.01)
(58) Field of Classification Search
 CPC .............. G01B 9/0201; G01B 9/02045; G01B 9/02072; G01B 9/02083; G01B 2290/70; G02B 26/06; G01H 9/00
 See application file for complete search history.

(56) References Cited

U.S. PATENT DOCUMENTS

| | | | | |
|---|---|---|---|---|
| 2011/0259101 A1* | 10/2011 | Sato | ........................ | G01L 1/165 |
| | | | | 73/514.29 |
| 2022/0065613 A1* | 3/2022 | Kitagawa | ............... | G02B 26/06 |

| | | | | |
|---|---|---|---|---|
| 2023/0095129 A1* | 3/2023 | Shimizu | ............. | G01B 9/02084 |
| | | | | 356/450 |
| 2023/0168120 A1* | 6/2023 | Hayashi | ................... | G01H 9/00 |
| | | | | 73/657 |
| 2023/0243636 A1* | 8/2023 | Yamada | ................... | G01H 9/00 |
| | | | | 356/484 |
| 2023/0314121 A1* | 10/2023 | Yamada | ............... | G02B 27/283 |
| | | | | 356/450 |

FOREIGN PATENT DOCUMENTS

| | | |
|---|---|---|
| CN | 105241539 A | 1/2016 |
| JP | H0238889 U | 3/1990 |

(Continued)

OTHER PUBLICATIONS

Office Action for CN Patent Application No. 202310128655.6, issued on Nov. 21, 2025, 12 pages.

*Primary Examiner* — Michelle M Iacoletti
*Assistant Examiner* — Judy Dao Tran
(74) *Attorney, Agent, or Firm* — CHIP LAW GROUP

(57) ABSTRACT

A laser interferometer includes: a laser light source configured to emit first laser light; an optical modulator including a vibration element and configured to modulate the first laser light using the vibration element and generate second laser light including a modulation signal; a light receiving element configured to receive third laser light including a sample signal generated by the first laser light being reflected by an object and the second laser light, and output a light reception signal; a demodulation circuit configured to demodulate the sample signal from the light reception signal; and a correction circuit configured to detect a force acting on the vibration element from a change in vibration of the vibration element and correct the light reception signal based on the force.

17 Claims, 14 Drawing Sheets

(56) References Cited

FOREIGN PATENT DOCUMENTS

| JP | 2004184377 | A | 7/2004 |
| JP | 2007285898 | A | 11/2007 |
| JP | 2017049185 | A | 3/2017 |

* cited by examiner

| CHARACTERISTICS SUCH AS STRESS SENSITIVITY OF VARIOUS QUARTZ CRYSTAL VIBRATORS | | | | |
|---|---|---|---|---|
| | DOUBLE-TUNING FORK TYPE QUARTZ CRYSTAL VIBRATOR | QUARTZ CRYSTAL AT VIBRATOR | LONGITUDINAL QUARTZ CRYSTAL VIBRATOR | SAW RESONATOR |
| VIBRATION MODE | BENDING VIBRATION | THICKNESS SHEAR VIBRATION | LONGITUDINAL VIBRATION | SURFACE ELASTIC WAVE |
| STRESS SENSITIVITY (/ATMOSPHERIC PRESSURE) | 4130 ppm | 135 ppm | 74 ppm | 186 ppm |
| DYNAMIC RANGE | 54100 ppm | 473 ppm | 969 ppm | 2420 ppm |
| TEMPERATURE CHARACTERISTICS $-10 \sim +60°C$ | 47.0 ppm | 6.0 ppm | 25.0 ppm | 45.0 ppm |
| DYNAMIC RANGE/ TEMPERATURE CHARACTERISTICS | 1150 | 79 | 39 | 54 |

GND $V_{cc}$ $V_{cc}$

Figure 9:
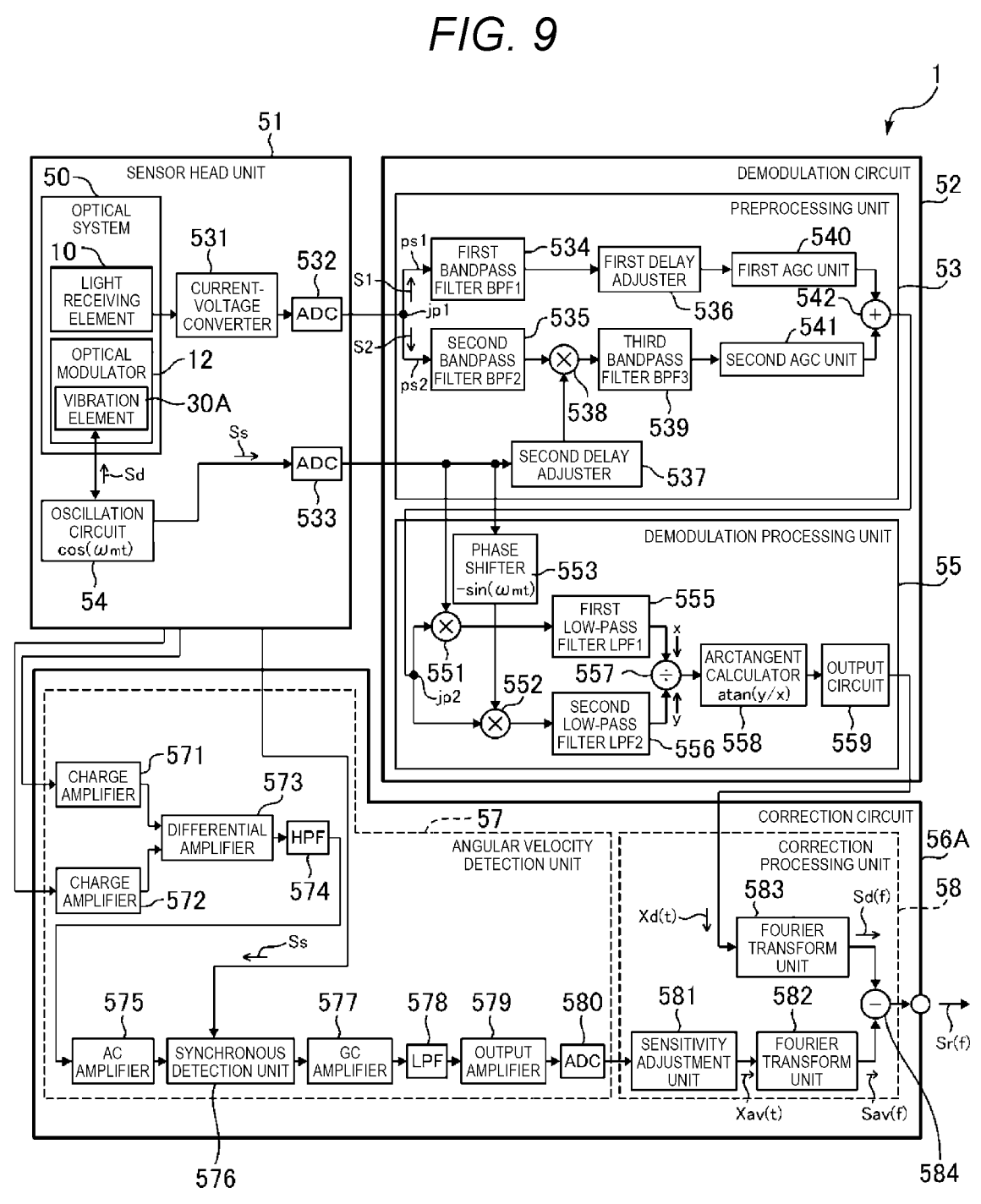

SENSOR HEAD UNIT
51
50
OPTICAL SYSTEM
10
LIGHT RECEIVING ELEMENT
OPTICAL MODULATOR  12
VIBRATION ELEMENT  30A
531
CURRENT-VOLTAGE CONVERTER
532
ADC
S1
S2
533
ADC
Ss
Sd
OSCILLATION CIRCUIT cos(ωmt)
54

DEMODULATION CIRCUIT
1
52
PREPROCESSING UNIT
ps1
534
FIRST BANDPASS FILTER BPF1
FIRST DELAY ADJUSTER
536
540
FIRST AGC UNIT
542
53
jp1
535
SECOND BANDPASS FILTER BPF2
538
THIRD BANDPASS FILTER BPF3
539
541
SECOND AGC UNIT
ps2
SECOND DELAY ADJUSTER
537
+

DEMODULATION PROCESSING UNIT
55
PHASE SHIFTER -sin(ωmt)
553
551
jp2
552
FIRST LOW-PASS FILTER LPF1
x
557
÷
555
ARCTANGENT CALCULATOR atan(y/x)
558
OUTPUT CIRCUIT
559
SECOND LOW-PASS FILTER LPF2
556
y 571 CHARGE AMPLIFIER
573 DIFFERENTIAL AMPLIFIER
HPF
574
572 CHARGE AMPLIFIER
57
ANGULAR VELOCITY DETECTION UNIT
Ss
575 AC AMPLIFIER
577 SYNCHRONOUS DETECTION UNIT
578 GC AMPLIFIER
579 LPF
580 OUTPUT AMPLIFIER
ADC
576

CORRECTION CIRCUIT
CORRECTION PROCESSING UNIT
56A
583
Xd(t)
FOURIER TRANSFORM UNIT
Sd(f)
58
581 SENSITIVITY ADJUSTMENT UNIT
582 FOURIER TRANSFORM UNIT
Xav(t)
Sav(f)
−
Sr(f)
584

FIG. 12

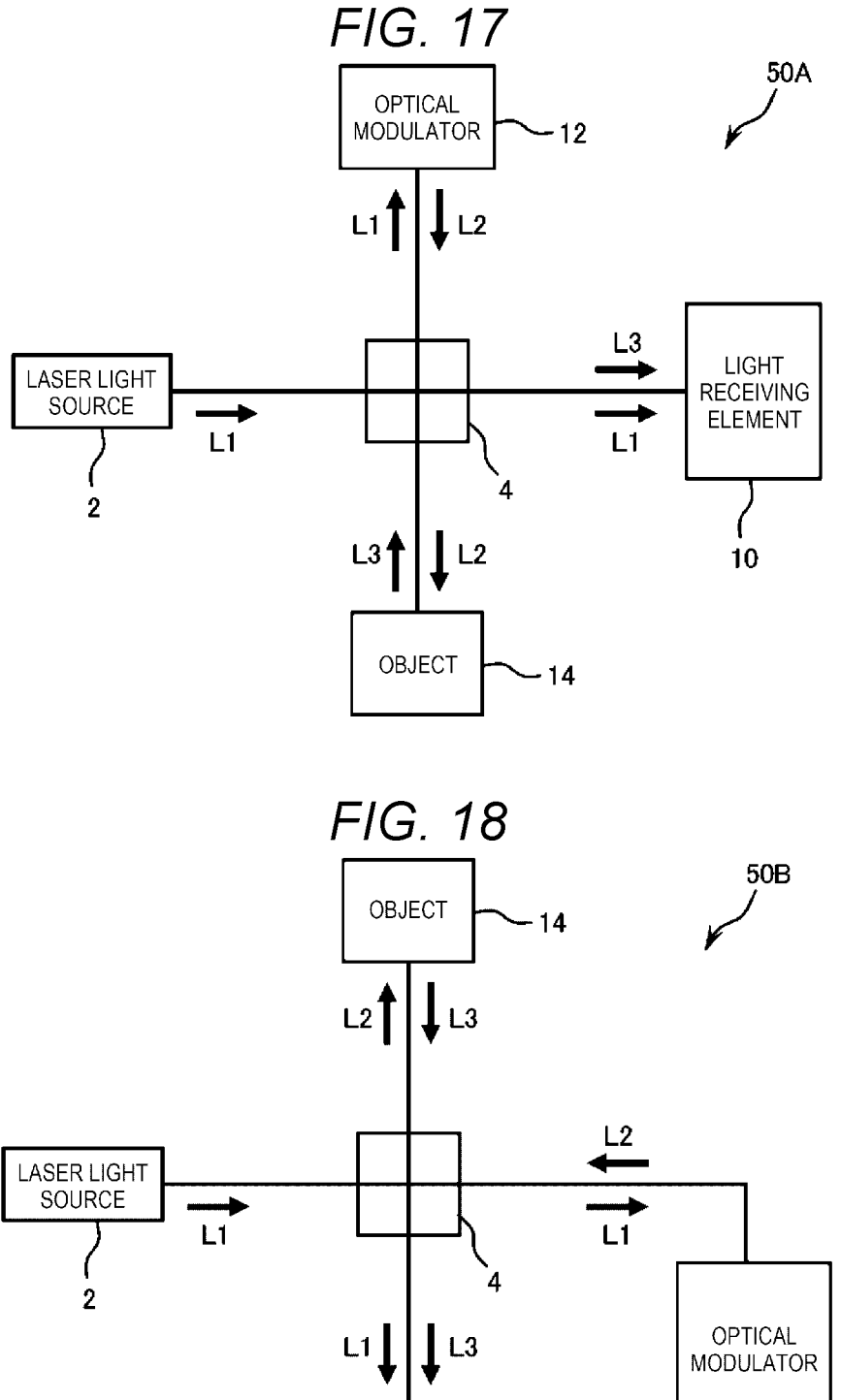

LASER INTERFEROMETER

The present application is based on, and claims priority from JP Application Serial Number 2022-023681, filed Feb. 18, 2022, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer as a device for measuring a vibration speed of an object. In this laser vibrometer, an object to be measured is irradiated with laser light. A vibration speed of the object to be measured is measured based on scattered laser light subjected to a Doppler shift.

The laser vibrometer disclosed in JP-A-2007-285898 includes an acousto-optic modulator (AOM). The acousto-optic modulator shifts a frequency of the laser light by changing a frequency of supplied ultrasonic waves. In the laser vibrometer, the laser light whose frequency is shifted is used as reference light. Then, scattered laser light derived from the object to be measured and the reference light derived from the acousto-optic modulator are superimposed to extract a beat frequency. A vibration speed of the object to be measured can be obtained from the beat frequency thus extracted in a non-contact manner.

On the other hand, vibration of a building or a facility in which the laser vibrometer is installed is a disturbance when measuring the vibration speed of the object to be measured, and reduces measurement accuracy.

Therefore, JP-A-2004-184377 proposes a method of identifying vibration characteristics of a structure in which a contact type vibrometer is attached to a non-contact type vibrometer and vibration of the structure is measured at the same time. In this method, when a frequency characteristic obtained from time-series vibration data measured by the non-contact type vibration meter is represented by $S_L(f)$ and a frequency characteristic obtained from time-series vibration data measured by the contact type vibration meter is represented by $S_S(f)$, calculation of $S_L(f)-S_S(f)=S_M(f)$ is performed. The frequency characteristic $S_M(f)$ obtained by the calculation is obtained by removing influence of the vibration in the non-contact type vibration meter. Therefore, due to the calculation, it is possible to correctly measure the vibration of the structure.

However, in the method described in JP-A-2004-184377, since it is necessary to attach the contact type vibration meter to the non-contact type vibration meter, an increase in size of the laser vibrometer cannot be avoided. For this reason, it is a challenge to implement a laser vibrometer which has a function of reducing influence of a disturbance in a measurement result of an object and which has a small size.

SUMMARY

A laser interferometer according to an application example of the present disclosure includes: a laser light source configured to emit first laser light; an optical modulator including a vibration element and configured to modulate the first laser light using the vibration element and generate second laser light including a modulation signal; a light receiving element configured to receive third laser light including a sample signal generated by the first laser light being reflected by an object and the second laser light, and output a light reception signal; a demodulation circuit configured to demodulate the sample signal from the light reception signal; and a correction circuit configured to detect a force acting on the vibration element from a change in vibration of the vibration element and correct the light reception signal based on the force.

A laser interferometer according to an application example of the present disclosure includes: a laser light source configured to emit first laser light; an optical modulator including a vibration element and configured to modulate the first laser light using the vibration element and generate second laser light including a modulation signal; a light receiving element configured to receive third laser light and the first laser light, and output a light reception signal, the third laser light including the modulation signal and a sample signal that is generated by the second laser light being reflected by an object; a demodulation circuit configured to demodulate the sample signal from the light reception signal; and a correction circuit configured to detect a force acting on the vibration element from a change in vibration of the vibration element and correct the light reception signal based on the force.

A laser interferometer according to an application example of the present disclosure includes: a laser light source configured to emit first laser light; an optical modulator including a vibration element and configured to modulate, using the vibration element, third laser light including a sample signal generated by the first laser light being reflected by an object, and generate second laser light including the sample signal and the modulation signal; a light receiving element configured to receive the second laser light, which includes the sample signal and the modulation signal, and the first laser light, and output a light reception signal; a demodulation circuit configured to demodulate the sample signal from the light reception signal; and a correction circuit configured to detect a force acting on the vibration element from a change in vibration of the vibration element and correct the light reception signal based on the force.

BRIEF DESCRIPTION OF THE DRAWINGS

FIG. 1 is a functional block diagram showing a laser interferometer according to a first embodiment.

FIG. 4 is a table in which various characteristics of various types of quartz crystal vibrators are compared.

FIG. 5 is a cross-sectional view showing the optical modulator having a package structure.

FIG. 9 is a functional block diagram showing a laser interferometer according to a second embodiment.

FIG. 12 is a functional block diagram showing a laser interferometer according to a third embodiment.

FIG. 17 is a schematic configuration diagram showing an optical system according to a first modification.

FIG. 18 is a schematic configuration diagram showing an optical system according to a second modification.

DESCRIPTION OF EXEMPLARY EMBODIMENTS

Figure 2:
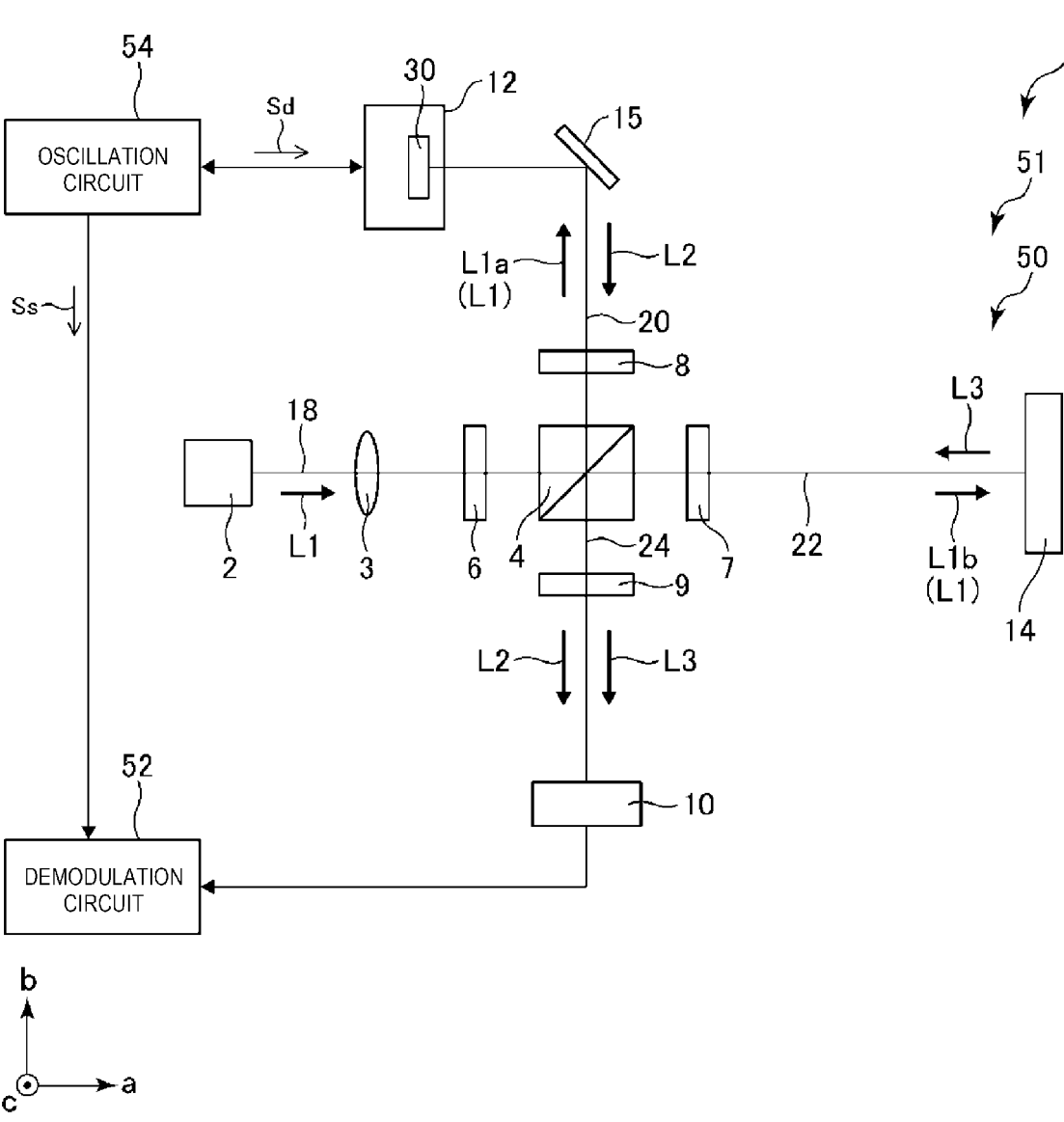
FIG. 2 is a schematic configuration diagram showing a sensor head unit shown in FIG. 1.

Hereinafter, a laser interferometer according to an aspect of the present disclosure will be described in detail based on embodiments shown in the accompanying drawings.

1. First Embodiment

First, a laser interferometer according to a first embodiment will be described.

Figure 1:
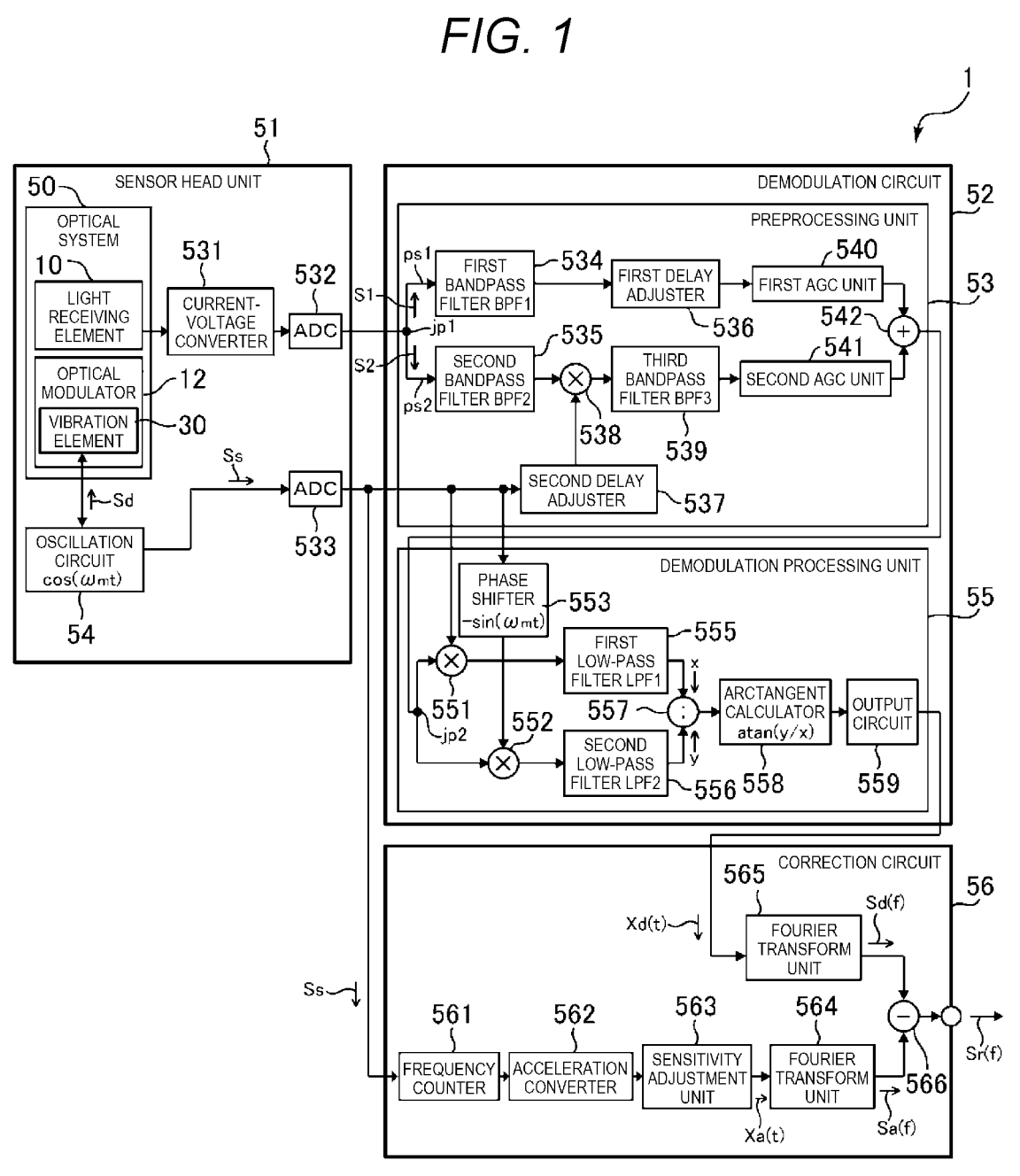

FIG. 1 is a functional block diagram showing a laser interferometer 1 according to the first embodiment.

The laser interferometer 1 shown in FIG. 1 includes a sensor head unit 51, and a demodulation circuit 52 to which a light detection signal from an optical system 50 is input, and a correction circuit 56. The sensor head unit 51 includes the optical system 50, a current-voltage converter 531, and an oscillation circuit 54. The laser interferometer 1 irradiates a moving object 14 with laser light, and detects and analyzes reflected light. Accordingly, a displacement and a speed of the object 14 are measured.

1.1. Sensor Head Unit

FIG. 2 is a schematic configuration diagram showing the sensor head unit 51 shown in FIG. 1. In FIG. 2, an a axis, a b axis, and a c axis are set as three axes orthogonal to one another, and are indicated by arrows. A tip end side of an arrow is defined as "plus". A base end side of the arrow is defined as "minus". For example, both a plus side and a minus side of the a axis are referred to as an "a-axis direction". The same applies to a b-axis direction and a c-axis direction.

1.1.1. Optical System

As shown in FIG. 2, the optical system 50 includes a laser light source 2, a collimator lens 3, a light splitter 4, a half-wavelength plate 6, a quarter-wavelength plate 7, a quarter-wavelength plate 8, an analyzer 9, a light receiving element 10, a frequency shifter type optical modulator 12, and a reflective element 15.

The laser light source 2 emits emission light L1 (first laser light). The light receiving element 10 converts received light into an electric signal. The optical modulator 12 includes a vibration element 30, and changes a frequency of the emission light L1 to generate reference light L2 (second laser light) including a modulation signal. The emission light L1 incident on the object 14 is reflected as object light L3 (third laser light) including a sample signal that is a Doppler signal derived from the object 14.

An optical path connecting the light splitter 4 and the laser light source 2 is referred to as an optical path 18. An optical path connecting the light splitter 4 and the optical modulator 12 is referred to as an optical path 20. An optical path connecting the light splitter 4 and the object 14 is referred to as an optical path 22. An optical path connecting the light splitter 4 and the light receiving element 10 is referred to as an optical path 24. The "optical path" in the present specification indicates a path that is provided between optical components and along which light travels.

On the optical path 18, the half-wavelength plate 6 and the collimator lens 3 are disposed in this order from a light splitter 4 side. On the optical path 20, the quarter-wavelength plate 8 and the reflective element 15 are disposed in this order from the light splitter 4 side. The quarter-wavelength plate 7 is disposed on the optical path 22. The analyzer 9 is disposed on the optical path 24.

The emission light L1 emitted from the laser light source 2 passes through the optical path 18 and is split into two light beams by the light splitter 4. First split light L1*a*, which is one light beam of the split emission light L1, is incident on the optical modulator 12 through the optical path 20. In the example of FIG. 2, an incident optical axis of the first split light L1*a*, that is, the optical path 20 through which the first split light L1*a* is incident on the optical modulator 12 is parallel to the a axis. Second split light L1*b*, which is the other light beam of the split emission light L1, is incident on the object 14 through the optical path 22. In the example of FIG. 2, the incident optical axis of the second split light L1*b*, that is, the optical path 22 is parallel to the a axis. The reference light L2, which is generated by the optical modulator 12 modulating a frequency of the emission light L1, is incident on the light receiving element 10 through the optical path 20 and the optical path 24. The object light L3 generated by the reflection on the object 14 is incident on the light receiving element 10 through the optical path 22 and the optical path 24.

Hereinafter, units of the optical system 50 will be further described.

1.1.1.1. Laser Light Source

The laser light source 2 is a laser light source that emits the emission light L1 having coherence. A light source having a line width of a band of MHz or less may be used as the laser light source 2. Specific examples of the laser light source 2 include a gas laser such as a He—Ne laser, and a semiconductor laser element such as a distributed feedback-laser diode (DFB-LD), a laser diode with fiber bragg grating (FBG-LD), a vertical cavity surface emitting laser (VCSEL) diode, and a Fabry-Perot laser diode (FP-LD).

In particular, the laser light source 2 is preferably a semiconductor laser element. Accordingly, it is possible to reduce a size of the laser light source 2 in particular. Therefore, it is possible to reduce a size of the laser interferometer 1. In particular, in the laser interferometer 1, since the sensor head unit 51 in which the optical system 50 is accommodated is reduced in size and weight, it is useful in that operability of the laser interferometer 1, such as a degree of installation freedom of the sensor head unit 51, is improved.

1.1.1.2. Collimator Lens

The collimator lens 3 is an optical element disposed between the laser light source 2 and the light splitter 4. An example of the collimator lens 3 includes an aspherical lens. The collimator lens 3 collimates the emission light L1 emitted from the laser light source 2. When the emission light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser element, the laser interferometer 1 preferably includes the collimator lens 3 disposed between the laser light source 2 and the light splitter 4. Accordingly, the emission light L1 emitted from the semiconductor laser element can be collimated. As a result, since the emission light L1 becomes collimated light, it is possible to prevent an increase in sizes of various optical components that receive the emission light L1, and it is possible to reduce the size of the laser interferometer 1.

When the emission light L1 that becomes collimated light passes through the half-wavelength plate 6, the emission light L1 is converted into linearly polarized light having an intensity ratio of P-polarized light to S-polarized light of, for example, 50:50, and is incident on the light splitter 4.

1.1.1.3. Light Splitter

The light splitter 4 is a polarization beam splitter disposed between the laser light source 2 and the optical modulator 12 and between the laser light source 2 and the object 14. The light splitter 4 has a function of transmitting P-polarized light and reflecting S-polarized light. With such a function, the light splitter 4 splits the emission light L1 into the first split light L1a that is light reflected by the light splitter 4 and the second split light L1b that is light transmitted through the light splitter 4.

The first split light L1a, which is S-polarized light reflected by the light splitter 4, is converted into circularly polarized light by the quarter-wavelength plate 8, and is incident on the optical modulator 12. The first split light L1a incident on the optical modulator 12 is subjected to a frequency shift of $f_m$ [Hz] and is reflected as the reference light L2. Therefore, the reference light L2 includes a modulation signal of a frequency $f_m$ [Hz]. The reference light L2 is converted into P-polarized light when the reference light L2 transmits through the quarter-wavelength plate 8 again. The P-polarized light of the reference light L2 transmits through the light splitter 4 and the analyzer 9 and is incident on the light receiving element 10.

The second split light L1b, which is P-polarized light transmitted through the light splitter 4, is converted into circularly polarized light by the quarter-wavelength plate 7, and is incident on the object 14 in a moving state. The second split light L1b incident on the object 14 is subjected to a Doppler shift of $f_d$ [Hz] and is reflected as the object light L3. Therefore, the object light L3 includes a sample signal of a frequency $f_d$ [Hz]. The object light L3 is converted into S-polarized light when the object light L3 transmits through the quarter-wavelength plate 7 again. The S-polarized light of the object light L3 is reflected by the light splitter 4, transmits through the analyzer 9, and is incident on the light receiving element 10.

As described above, since the emission light L1 has coherence, the reference light L2 and the object light L3 are incident on the light receiving element 10 as interference light.

A non-polarization beam splitter may be used instead of the polarization beam splitter. In this case, the half-wavelength plate 6, the quarter-wavelength plate 7, the quarter-wavelength plate 8, and the like are not necessary. Therefore, it is possible to reduce the size of the laser interferometer 1 by reducing the number of components. A light splitter other than a beam splitter may be used.

1.1.1.4. Analyzer

Since the S-polarized light and the P-polarized light orthogonal to each other are independent of each other, a beat due to interference does not appear by simply superimposing the S-polarized light and the P-polarized light. Therefore, light waves obtained by superimposing the S-polarized light and the P-polarized light pass through the analyzer 9 being inclined by 45° with respect to both the S-polarized light and the P-polarized light. By using the analyzer 9, it is possible to transmit light having common components and cause the interference. As a result, in the analyzer 9, the reference light L2 and the object light L3 interfere with each other, and interference light having a frequency of $|f_m - f_d|$ [Hz] is generated.

1.1.1.5. Light Receiving Element

When the interference light is incident on the light receiving element 10, the light receiving element 10 outputs a photocurrent (light reception signal) corresponding to an intensity of the interference light. By demodulating a sample signal from the light reception signal by a method to be described later, it is possible to finally obtain a movement, that is, a displacement and a speed of the object 14. Examples of the light receiving element 10 include a photodiode. The light received by the light receiving element 10 is not limited to the interference light as long as the light includes the reference light L2 and the object light L3. In the present specification, "demodulating a sample signal from a light reception signal" includes demodulating a sample signal from various signals converted from a photocurrent (light reception signal).

1.1.1.6. Optical Modulator

Figure 3:
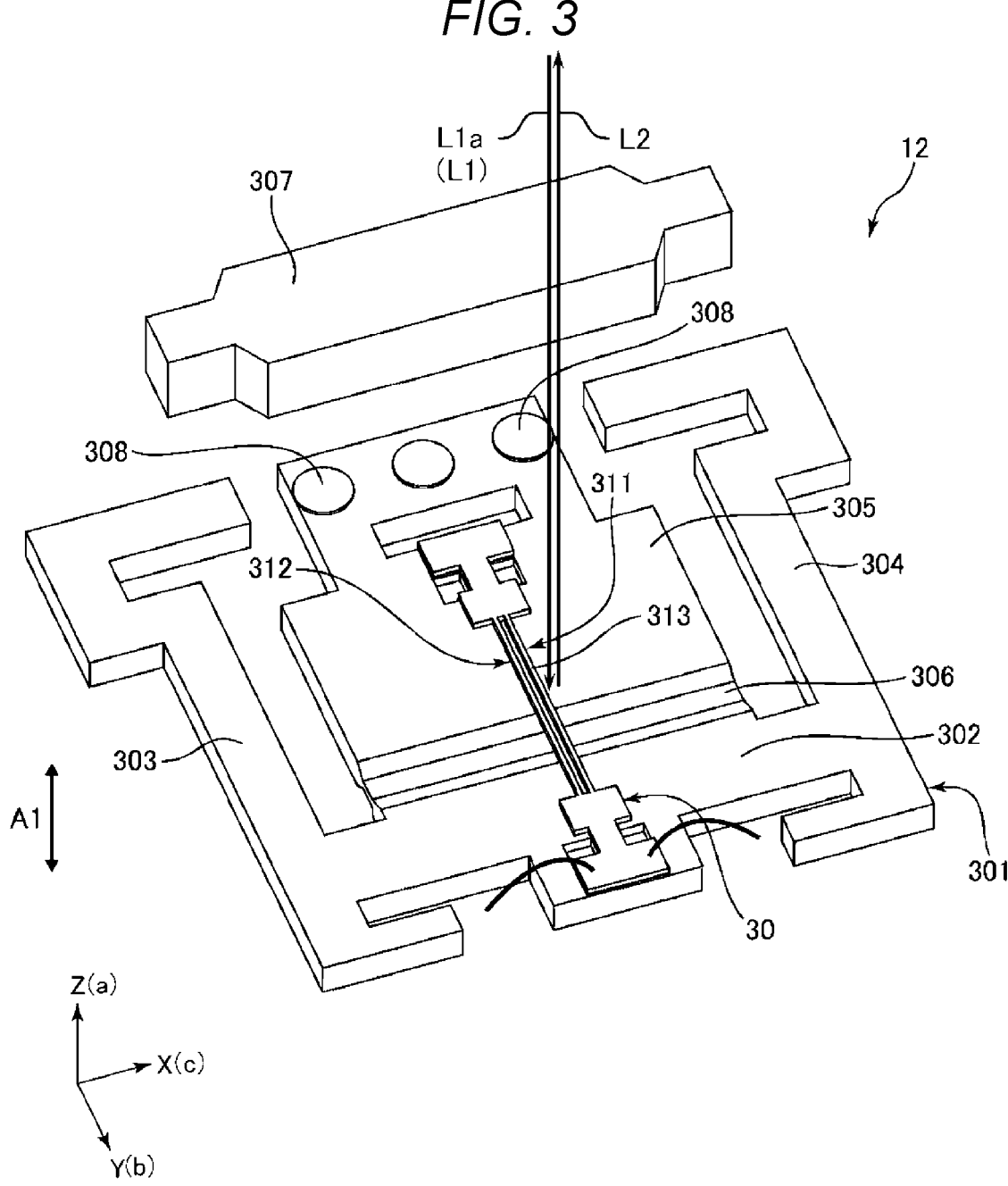
FIG. 3 is a perspective view showing an optical modulator in FIG. 2.

FIG. 3 is a perspective view showing the optical modulator 12 in FIG. 2. In FIG. 3, an X axis, a Y axis, and a Z axis are set as three axes orthogonal to one another, and are indicated by arrows. A tip end side of an arrow is defined as "plus". A base end side of the arrow is defined as "minus". For example, both a plus side direction and a minus side direction of the X axis are referred to as an "X-axis direction". The same applies to a Y-axis direction and a Z-axis direction.

1.1.1.6.1. Vibration Element

The optical modulator 12 shown in FIG. 3 includes a substrate structure 301 including a base portion 302 and arms 303 and 304, a movable portion 305, a constricted portion 306, a weight 307, and a vibration element 30.

Each of the arms 303 and 304 extends in the Y-axis direction such that a tip end portion is on a Y-axis minus side and a base end portion is on a Y-axis plus side. The movable portion 305 is disposed between the arm 303 and the arm 304 in the X-axis direction, and is coupled to the base portion 302 via the constricted portion 306. The movable portion 305 is a cantilever having the constricted portion 306 as a fulcrum.

The vibration element 30 shown in FIG. 3 is, for example, a double-tuning fork type quartz crystal vibrator. The vibration element 30 extends in the Y-axis direction, and is disposed across the constricted portion 306 in a plan view seen from the Z-axis direction. An end portion of the vibration element 30 on the Y-axis minus side is attached to the movable portion 305. An end portion of the vibration element 30 on the Y-axis plus side is attached to the base portion 302.

The vibration element 30 includes a quartz crystal element including two vibrating beam portions 311 and 312 shown in FIG. 3, an electrode which is not shown, and a light reflecting surface 313. The quartz crystal element is manufactured by processing, for example, a quartz crystal Z plate. The electrode is provided on a surface of the quartz crystal element. When an AC voltage is applied to the electrode, the vibrating beam portions 311 and 312 are bent so as to repeatedly separate from and approach each other. Accordingly, the vibrating beam portions 311 and 312 are bent and vibrated in the X-axis direction.

The light reflecting surface 313 is provided on a surface parallel to an X-Y plane of the vibrating beam portion 311, and has a function of reflecting the emission light L1. The light reflecting surface 313 may be a surface of an electrode, which is not shown, provided on the surface, or may be a surface of a light reflecting film provided separately from the electrode.

The weight 307 is formed of, for example, a metal material such as stainless steel or copper. The weight 307 is attached to the movable portion 305 via bonding portions 308. Accordingly, the weight 307 is displaced in the Z-axis direction together with the movable portion 305. The arms 303 and 304 prevent an excessive displacement of the weight 307.

When the vibrating beam portions 311 and 312 are bent and vibrated in the X-axis direction, the light reflecting surface 313 is also vibrated in the X-axis direction. Such bending vibration in the X-axis direction is referred to as in-plane vibration.

On the other hand, when the in-plane vibration is generated in the vibrating beam portions 311 and 312, at the same time, Z-reverse-phase spurious vibration that vibrates the light reflecting surface 313 in the Z-axis direction is excited. The Z-reverse-phase spurious vibration is an example of out-of-plane vibration.

Such out-of-plane vibration is excited by energetically coupling with the in-plane vibration. Normally, the out-of-plane vibration coupled to the in-plane vibration is avoided or prevented. However, in the embodiment, the out-of-plane vibration is actively excited to cause the light reflecting surface 313 to interact with the frequency of the emission light L1. In order to couple the out-of-plane vibration to the in-plane vibration, a shape of the vibration element 30, an arrangement of the electrode, which is not shown, and the like may be adjusted. For example, when a cross-sectional shape of the vibrating beam portions 311 and 312 is changed from a rectangular shape to a parallelogram shape, the out-of-plane vibration is easily excited.

When the emission light L1 is incident on the light reflecting surface 313 in a state in which such out-of-plane vibration is generated, interaction occurs between the vibration of the light reflecting surface 313 and the frequency of the emission light L1. Accordingly, it is possible to implement the optical modulator 12 that performs frequency modulation of the emission light L1. As a result, the reference light L2 can be generated from the emission light L1.

There are various modes of the out-of-plane vibration. The out-of-plane vibration used in the vibration element 30 is not limited to the Z-reverse-phase spurious vibration, and may be vibration in any mode.

A length of the vibration element 30 in the Y-axis direction is, for example, about 0.2 mm or more and 5.0 mm or less. A thickness of the vibration element 30 in the Z-axis direction is, for example, about 0.003 mm or more and 0.5 mm or less.

A shape of the quartz crystal element included in the vibration element 30 is not limited to the double-tuning fork type as shown in FIG. 3, and may be any shape. The vibration element 30 may be a vibration element having a vibration mode other than the bending vibration.

When a drive signal Sd is supplied (AC voltage is applied) from the oscillation circuit 54 shown in FIGS. 1 and 2 to the vibration element 30 shown in FIG. 3, the vibration element 30 as described above oscillates. Electric power (driving power) required for the oscillation of the vibration element 30 is not particularly limited, and is as small as about 0.1 µW to 100 mW. Therefore, the drive signal Sd output from the oscillation circuit 54 can be used to cause the vibration element 30 to oscillate without being amplified.

In an acousto-optic modulator (AOM) or an electro-optic modulator (EOM) that is an optical modulator in the related art, a structure for maintaining a temperature of the optical modulator may be necessary. Therefore, it is difficult to reduce a volume of the optical modulator in the related art. Since these optical modulators have large electric power consumption, it may be difficult to reduce the size and electric power consumption of the laser interferometer. In contrast, in the embodiment, since a volume of the vibration element 30 is fairly small and electric power required for the oscillation is small, a size and electric power consumption of the laser interferometer 1 can be easily reduced.

On the other hand, the vibration element 30 is used not only for the frequency modulation of the emission light L1, but also has a function as an acceleration sensor.

When an acceleration is applied in the Z-axis direction, for example, in a state in which the vibrating beam portions 311 and 312 are bent and vibrated in the X-axis direction, an inertial force acts on the weight 307. When the movable portion 305 is displaced in the Z-axis direction with the inertial force, a stress changes in the vibrating beam portions 311 and 312. When the stress changes, a resonance frequency of the vibration element 30 changes as compared with that before the change. By detecting the change in the resonance frequency, the inertial force can be detected and the acceleration can be obtained. Accordingly, the vibration element 30 can function as an acceleration sensor.

The correction circuit 56, which will be described later, sequentially reads a frequency value of a reference signal Ss output from the oscillation circuit 54 that operates using the vibration element 30 as a signal source. Then, the change in the resonance frequency of the vibration element 30 is detected from a change in the frequency value. The inertial force and the acceleration are obtained from a change amount. The correction circuit 56 corrects a light reception signal based on a force acting on the vibration element 30. In the present specification, "based on a force acting on the vibration element 30" includes, for example, obtaining a physical quantity from the force acting on the vibration element 30 and based on the physical quantity. In the present specification, "correct a light reception signal" means correcting a light reception signal (photocurrent) output from the light receiving element 10 or various signals converted from the light reception signal.

By performing such correction, even when the acceleration as the disturbance is applied to the laser interferometer 1, the influence of the disturbance can be removed from a measurement result of the object 14 or the influence of the disturbance can be reduced. Accordingly, the displacement and the speed of the object 14 are measured with higher accuracy.

Of accelerations applied to the laser interferometer 1, an acceleration in a direction parallel to the incident optical axis of the emission light L1 incident on the object 14 greatly affects the measurement result of the object 14. Therefore, it is preferable to dispose the vibration element 30 such that a direction of the detected acceleration is parallel to the incident optical axis of the emission light L1 with respect to the object 14. Accordingly, it is possible to more accurately detect the acceleration that affects measurement accuracy of the object 14. As a result, the measurement accuracy of the object 14 can be further improved.

Examples of a situation in which the acceleration is applied to the laser interferometer 1 include a situation in which the vibration is applied to a room or a building in which the laser interferometer 1 is placed. When the vibration is applied, the acceleration applied to the laser interferometer 1 changes with time. At this time, since a change also occurs in the vibration of the vibration element 30, a temporal change of the acceleration can be obtained based on the change.

In the case of the vibration element 30 shown in FIG. 3, an acceleration detection axis A1 is parallel to the Z axis. The incident optical axis of the emission light L1 incident on the object 14 is parallel to the a-axis in FIG. 2. Therefore, the optical modulator 12 including the vibration element 30 shown in FIG. 3 may be installed such that the Z axis (acceleration detection axis A1) in FIG. 3 and the a axis in FIG. 2 are preferably parallel to each other.

The vibration element 30 is not limited to the double-tuning fork type quartz crystal vibrator, and may be, for example, various quartz crystal vibrators such as a tuning fork type quartz crystal vibrator, a quartz crystal AT vibrator, a longitudinal quartz crystal vibrator, and a surface acoustic wave (SAW) resonator.

FIG. 4 is a table in which various characteristics of various types of quartz crystal vibrators are compared. Characteristic values shown in FIG. 4 are examples. The present disclosure is not limited thereto.

As shown in FIG. 4, when characteristics such as a stress sensitivity and a dynamic range are compared, it can be seen that the double-tuning fork type quartz crystal vibrator is better than other types of quartz crystal vibrators. The stress sensitivity is a sensitivity when detecting a force acting on the vibration element 30. The dynamic range is a range of detectable forces. When these characteristics are favorable, it is possible to implement the vibration element 30 having excellent performance as an acceleration sensor. Therefore, it is particularly preferable that the vibration element 30 is a double-tuning fork type quartz crystal vibrator.

The vibration element 30 is not limited to a quartz crystal vibrator, and may be a silicon vibrator or a ceramic vibrator. The quartz crystal vibrator, the silicon vibrator, and the ceramic vibrator are different from other vibrators such as a piezoelectric element, and are vibrators using a resonance phenomenon, and thus have a high Q value and can easily have a stabilized natural frequency. In the present specification, such a vibrator using a resonance phenomenon based on a high Q value is referred to as a "self-excited oscillation vibrator". By using the self-excited oscillation vibrator as the vibration element 30, a modulation signal can be stabilized, and the oscillation circuit 54 operating with the vibration element 30 as a signal source can output the reference signal Ss having higher accuracy. In addition, both the modulation signal and the reference signal Ss are processed in real time by the demodulation circuit 52. For this reason, even if both signals are subjected to disturbances, the disturbances are offset or reduced by each other, and processing results thereof are less likely to be affected. Therefore, a sample signal derived from the object 14 can be demodulated at a high S/N ratio (signal-to-noise ratio). The laser interferometer 1 capable of measuring the speed and the displacement of the object 14 with higher accuracy can be implemented.

By using the self-excited oscillation vibrator as the vibration element 30, it is possible to improve the performance as various sensors such as an acceleration sensor, an angular velocity sensor (gyro sensor) to be described later, and an atmospheric pressure sensor. As a result, the accuracy of the correction processing in the correction circuit 56 can be increased, and the displacement and the speed of the object 14 can be finally measured with higher accuracy.

The silicon vibrator is a vibrator that includes a single crystal silicon piece manufactured from a single crystal silicon substrate by using a micro electro mechanical systems (MEMS) technique, and a piezoelectric film. The MEMS refers to a micro electro mechanical system. Examples of a shape of the single crystal silicon piece include a cantilever beam shape such as a two-legged tuning fork type and a three-legged tuning fork type, and a double-supported beam shape. An oscillation frequency of the silicon vibrator is, for example, about 1 kHz to several hundreds of MHz.

The ceramic vibrator is a vibrator that includes a piezoelectric ceramic piece manufactured by sintering a piezoelectric ceramic, and an electrode. Examples of the piezoelectric ceramic include lead zirconate titanate (PZT) and barium titanate (BTO). An oscillation frequency of the ceramic vibrator is, for example, about several hundreds of kHz to several tens of MHz.

1.1.1.6.2. Package Structure

The optical modulator 12 may have a package structure. FIG. 5 is a cross-sectional view showing the optical modulator 12 having a package structure. The package structure refers to a structure in which the vibration element 30 is hermetically sealed in a container 70 (housing) shown in FIG. 5.

The optical modulator 12 shown in FIG. 5 includes the container 70 including an accommodating portion as an internal space, the vibration element 30 accommodated in the container 70, and a circuit element 45 constituting a part of the oscillation circuit 54.

As shown in FIG. 5, the container 70 includes a container body 72 and a lid 74. The container body 72 includes a recessed portion 720 provided inside the container body 72 and a step portion 721 placed on a bottom surface of the recessed portion 720. The container body 72 is formed of a ceramic material, a resin material, or the like. The container body 72 includes an internal terminal, which is not shown, provided on an inner surface, external terminals 76 provided on an outer surface, and a wiring, which is not shown, coupling the internal terminal and the external terminals 76.

An opening of the container body 72 is closed by the lid 74 via a sealing member 73 such as a seal ring or low-melting glass. Further, when a straight line parallel to the Z axis is drawn from the vibration element 30, a transmission window through which the emission light L1 and the reference light L2 are transmitted is provided in a part of the lid 74 intersecting the straight line. Accordingly, the emission light L1 can be made incident on the light reflecting surface 313 shown in FIG. 3, and the generated reference light L2 can be emitted to the outside of the container body 72.

The accommodating portion of the container 70 is preferably hermetically sealed. Accordingly, the accommodating portion can be maintained in a state of being depressurized, or can be maintained in a state of being filled with various gases. By reducing a pressure in the accommodating portion, it is possible to reduce air resistance in the out-of-plane vibration of the vibration element 30. Therefore, vibration efficiency of the vibration element 30 accommodated in the accommodating portion can be increased, and the displacement of the light reflecting surface 313 can be further increased. Oscillation of the vibration element 30 can be stabilized. As a result, the S/N ratio of the modulation signal can be further increased. Finally, the sample signal can be demodulated with a higher S/N ratio. By filling various gases, for example, deterioration of the vibration element 30 can be prevented.

A pressure of the depressurized accommodating portion is not particularly limited as long as the pressure is less than an atmospheric pressure, and is preferably 100 Pa or less. On the other hand, a lower limit value may be set to about 10 Pa in consideration of maintaining the depressurized state satisfactorily.

The provision of the container 70 and the hermetic sealing of the container 70 are not essential, and may be omitted.

The vibration element 30 is supported by the step portion 721. The internal terminal of the container body 72 and the vibration element 30 are electrically coupled to each other via a conductive material, which is not shown, such as a bonding wire or a bonding metal.

The circuit element 45 is disposed on a bottom surface of the recessed portion 720. The circuit element 45 is electrically coupled to the internal terminal of the container body 72 via a conductive material which is not shown. Accordingly, the vibration element 30 and the circuit element 45 are also electrically coupled to each other via the wiring provided in the container body 72. The circuit element 45 may be provided in a circuit other than the oscillation circuit 54 to be described later.

By adopting such a package structure, the vibration element 30 and the circuit element 45 can be overlapped with each other. Therefore, a physical distance between the vibration element 30 and the circuit element 45 can be reduced. A wiring length between the vibration element 30 and the circuit element 45 can be shortened. Therefore, it is possible to prevent noise from entering the drive signal Sd from an outside, or conversely, it is possible to prevent the drive signal Sd from becoming a noise source. Both the vibration element 30 and the circuit element 45 can be protected from an external environment by one container 70. Therefore, it is possible to improve reliability of the laser interferometer 1 while reducing a size of the sensor head unit 51.

The package structure can reduce degassing, which is a cause of lowering a degree of vacuum, to be slight as compared with, for example, a case where the entire optical system 50 is hermetically sealed. Accordingly, in the optical modulator 12 adopting the package structure, long-term reliability is easily improved.

Further, the container 70 constituting the package structure described above can be manufactured together with the vibration element 30 by a manufacturing process at a wafer level. Therefore, a manufacturing cost of the optical modulator 12 adopting the package structure can be easily reduced.

A structure of the container 70 is not limited to the shown structure. For example, the vibration element 30 and the circuit element 45 may have separate package structures. Although not shown, other circuit elements constituting the oscillation circuit 54 and other circuit elements may be accommodated in the container 70. The container 70 may be provided as necessary, and may be omitted.

An incident direction of the emission light L1 in FIG. 3 is not limited to the Z-axis direction, and may be, for example, the X-axis direction.

1.1.2. Current-Voltage Converter

The current-voltage converter 531 is also called a transimpedance amplifier (TIA), and converts a photocurrent (light reception signal) output from the light receiving element 10 into a voltage signal and outputs the voltage signal as a light detection signal.

An ADC 532 shown in FIG. 1 is disposed between the current-voltage converter 531 and the demodulation circuit 52. The ADC 532 is an analog-to-digital converter, and converts an analog signal into a digital signal at a predetermined sampling bit rate. The ADC 532 is provided in the sensor head unit 51.

The optical system 50 may include a plurality of light receiving elements 10. In this case, a differential amplifier circuit is provided between the plurality of light receiving elements 10 and the current-voltage converter 531, so that it is possible to perform a differential amplification processing on a photocurrent and increase an S/N ratio of a light detection signal. The differential amplification processing may be performed on a voltage signal.

1.1.3. Oscillation Circuit

The oscillation circuit 54 outputs the drive signal Sd to the vibration element 30. The oscillation circuit 54 outputs the reference signal Ss to the demodulation circuit 52.

Figures 6, 7:
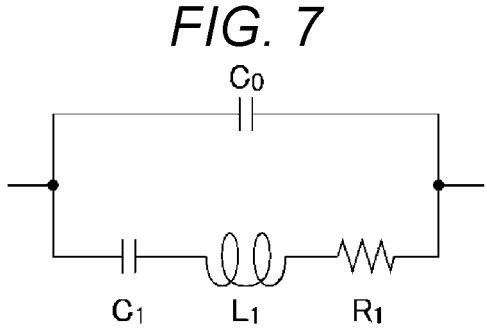
FIG. 6 is a circuit diagram showing a configuration of a one-stage inverter oscillation circuit.
FIG. 7 is an example of an LCR equivalent circuit of a vibration element.

The oscillation circuit 54 is not particularly limited as long as the oscillation circuit 54 is a circuit capable of oscillating the vibration element 30. Circuits having various configurations are used. FIG. 6 is a circuit diagram showing a configuration of a one-stage inverter oscillation circuit as an example of a circuit configuration.

The oscillation circuit 54 shown in FIG. 6 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are terminals coupled to an inverter inside the circuit element 45. A terminal GND is coupled to a ground potential. A terminal Vcc is coupled to a power supply potential. A terminal Y is a terminal for oscillation output.

The first capacitor Cg is coupled between the terminal X1 and the ground potential. The limiting resistor Rd and the second capacitor Cd coupled in series to each other are coupled in this order from a terminal X2 side, between the terminal X2 and the ground potential. Further, one end of the feedback resistor Rf is coupled between the terminal X1 and the first capacitor Cg. The other end of the feedback resistor Rf is coupled between the terminal X2 and the limiting resistor Rd.

One end of the vibration element 30 is coupled between the first capacitor Cg and the feedback resistor Rf. The other end of the vibration element 30 is coupled between the second capacitor Cd and the limiting resistor Rd. Accordingly, the vibration element 30 serves as a signal source of the oscillation circuit 54.

FIG. 7 is an example of an LCR equivalent circuit of the vibration element 30.

As shown in FIG. 7, the LCR equivalent circuit of the vibration element 30 includes a series capacitance $C_1$, a series inductance $L_1$, an equivalent series resistance $R_1$, and a parallel capacitance $C_0$.

In the oscillation circuit 54 shown in FIG. 6, when a capacitance of the first capacitor Cg is set as Cg and a capacitance of the second capacitor Cd is set as Cd, a load capacitance CL is given by the following formula (a).

$$C_L = \frac{C_d C_g}{C_d + C_g} \qquad \text{(a)}$$

Then, an oscillation frequency of a signal output from the terminal Y of the oscillation circuit 54, is given by the following formula (b).

$$f_{osc} = f_Q \sqrt{1 + \frac{C_1}{C_0 + C_L}} \qquad \text{(b)}$$

$f_Q$ is a natural frequency of the vibration element 30.

According to the above formula (b), it can be seen that the oscillation frequency $f_{osc}$ of a signal output from the terminal Y can be finely adjusted by appropriately changing the load capacitance $C_L$.

A difference $\Delta f$ between the natural frequency $f_Q$ of the vibration element 30 and the oscillation frequency $f_{osc}$, which is the frequency of the signal output from the oscillation circuit 54, is given by the following formula (c).

$$\Delta f = f_{osc} - f_Q = f_Q \left( \sqrt{1 + \frac{C_1}{C_0 + C_L}} - 1 \right) \qquad \text{(c)}$$

Here, since $C_1 \ll C_0$, and $C_1 \ll C_L$, $\Delta f$ is approximately given by the following formula (d).

$$\Delta f = f_{osc} - f_Q \cong \frac{C_1}{2(C_0 + C_L)} f_Q \qquad \text{(d)}$$

Therefore, the oscillation frequency $f_{osc}$ of the oscillation circuit 54 has a value corresponding to the natural frequency $f_Q$ of the vibration element 30.

Here, when the vibration element 30 is fixed to, for example, the container 70, the natural frequency $f_Q$ fluctuates if the vibration element 30 receives, via a fixing portion, an expansion stress caused by temperature. When the vibration element 30 is inclined, the natural frequency $f_Q$ fluctuates under the influence of gravity or the like due to its own weight.

In the oscillation circuit 54, when the natural frequency $f_Q$ fluctuates for such reasons, the oscillation frequency $f_{osc}$ changes in conjunction with the fluctuation according to the formula (d). That is, the oscillation frequency $f_{osc}$ constantly has a value shifted from the natural frequency $f_Q$ by $\Delta f$. Accordingly, the vibration of the vibration element 30 is stabilized, and a displacement amplitude is stabilized. When the displacement amplitude is stabilized, a modulation characteristic of the optical modulator 12 is stabilized. Therefore, it is possible to further increase the S/N ratio of the modulation signal. As a result, the demodulation accuracy of the sample signal in the demodulation circuit 52 can be improved.

For example, it is preferable that $\Delta f = |f_{osc} - f_Q| \leq 3000$ [Hz], and more preferable that $\Delta f$ 600 [Hz].

The laser interferometer 1 includes the demodulation circuit 52 and the oscillation circuit 54. Based on the reference signal Ss, the demodulation circuit 52 demodulates a sample signal derived from the object 14, from a light detection signal detected based on a photocurrent (light reception signal). The oscillation circuit 54 operates using the vibration element 30 as a signal source, and outputs the reference signal Ss to the demodulation circuit 52 as shown in FIG. 1.

According to such a configuration, even when the natural frequency $f_Q$ of the vibration element 30 fluctuates, the oscillation frequency $f_{osc}$ of the oscillation circuit 54 can be changed to a value corresponding to the natural frequency $f_Q$ of the vibration element 30. Therefore, the vibration of the vibration element 30 can be easily stabilized. Accordingly, a temperature characteristic of a modulation signal can be made to correspond to a temperature characteristic of the vibration element 30, and the modulation characteristic of the optical modulator 12 can be stabilized. As a result, the demodulation accuracy of the sample signal in the demodulation circuit 52 can be improved.

Since the electric power consumption of the oscillation circuit 54 is low, power consumption of the laser interferometer 1 can be easily reduced.

Instead of the oscillation circuit 54, for example, a signal generator such as a function generator or a signal generator may be used.

1.2. Demodulation Circuit

The demodulation circuit 52 performs a demodulation processing of demodulating a sample signal derived from the object 14, from a light detection signal output from the current-voltage converter 531. The sample signal includes, for example, phase information and frequency information. The displacement of the object 14 can be acquired base on the phase information. The speed of the object 14 can be acquired based on the frequency information. When different physical quantities can be acquired as described, the laser interferometer 1 can have functions of serving as a displacement meter and a speedometer. Therefore, it is possible to improve functionality of the laser interferometer 1.

A circuit configuration of the demodulation circuit 52 is set according to a method of a modulation processing. In the laser interferometer 1 according to the embodiment, the optical modulator 12 including the vibration element 30 is used. Since the vibration element 30 is an element that performs simple vibration, a vibration speed changes every moment in a cycle. Therefore, a modulation frequency also changes with time, and a demodulation circuit in the related art cannot be used.

The demodulation circuit in the related art refers to, for example, a circuit that demodulates a sample signal from a light reception signal that includes a modulation signal modulated using an acousto-optic modulator (AOM). In the acousto-optic modulator, a modulation frequency does not change. Therefore, the demodulation circuit in the related art can demodulate a sample signal from a light reception signal including a modulation signal whose modulation frequency does not change, but cannot demodulate a sample signal including a modulation signal modulated by the optical modulator 12 in which a modulation frequency changes.

Therefore, the demodulation circuit 52 shown in FIG. 1 includes a preprocessing unit 53 and a demodulation processing unit 55. A light detection signal output from the current-voltage converter 531 is first subjected to a preprocessing by the preprocessing unit 53, and then introduced to the demodulation processing unit 55. A signal that can be demodulated by a demodulation circuit in the related art is obtained by the preprocessing. Therefore, the demodulation processing unit 55 demodulates a sample signal derived from the object 14 by using a known demodulation method.

The above-described functions of the demodulation circuit 52 are implemented by, for example, hardware including a processor, a memory, an external interface, an input unit, a display unit, and the like. Specifically, the processor reads and executes a program stored in the memory, thereby implementing the functions. These components can communicate with one another via an internal bus.

Examples of the processor include a central processing unit (CPU) and a digital signal processor (DSP). Instead of a method in which these processors execute software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input/output port such as a universal serial bus (USB), and an Ethernet (registered trademark) port.

Examples of the input unit include various input devices such as a keyboard, a mouse, a touch panel, and a touch pad. Examples of the display unit include a liquid quartz crystal display panel and an organic electro luminescence (EL) display panel.

1.2.1. Configuration of Preprocessing Unit

The preprocessing unit 53 shown in FIG. 1 includes a first bandpass filter 534, a second bandpass filter 535, a first delay adjuster 536, a second delay adjuster 537, a multiplier 538, a third bandpass filter 539, a first AGC unit 540, a second AGC unit 541, and an adder 542. The AGC refers to auto gain control.

A light detection signal output from the current-voltage converter 531 is split into two signals, that is, a first signal S1 and a second signal S2 at a branch portion jp1. In FIG. 1, a path of the first signal S1 is referred to as a first signal path ps1. A path of the second signal S2 is referred to as a second signal path ps2.

An ADC 533 is coupled between the oscillation circuit 54 and the second delay adjuster 537. The ADC 533 is an analog-to-digital converter, and converts an analog signal into a digital signal at a predetermined sampling bit rate. The ADC 533 is provided in the sensor head unit 51.

Each of the first bandpass filter 534, the second bandpass filter 535, and the third bandpass filter 539 is a filter that selectively transmits a signal in a specific frequency band.

Each of the first delay adjuster 536 and the second delay adjuster 537 is a circuit that adjusts a delay of a signal. The multiplier 538 is a circuit that generates an output signal that is proportional to a product of two input signals. The adder 542 is a circuit that generates an output signal that is proportional to a sum of two input signals.

Next, an operation of the preprocessing unit 53 will be described following flows of the first signal S1, the second signal S2, and the reference signal Ss.

A group delay of the first signal S1 is adjusted by the first delay adjuster 536 after the first signal S1 passes through the first bandpass filter 534 disposed on the first signal path ps1. The group delay to be adjusted by the first delay adjuster 536 corresponds to a group delay of the second signal S2 caused by the second bandpass filter 535 to be described later. With such delay adjustment, delay times accompanying passage through filter circuits, that is, a delay time of the first signal S1 passing through the first bandpass filter 534 and a delay time of the second signal S2 passing through the second bandpass filter 535 and the third bandpass filter 539, can be made uniform. The first signal S1 passing through the first delay adjuster 536 passes through the first AGC unit 540 and is input to the adder 542.

The second signal S2 is input to the multiplier 538 after passing through the second bandpass filter 535 disposed on the second signal path ps2. The multiplier 538 multiplies the second signal S2 by the reference signal Ss output from the second delay adjuster 537. Specifically, the reference signal Ss that is represented by $\cos(\omega_m t)$ and that is output from the oscillation circuit 54 is subjected to a digital conversion by the ADC 533 and a phase adjustment by the second delay adjuster 537, and is input to the multiplier 538. The corn is an angular frequency of a modulation signal of the optical modulator 12, and the t is time. Thereafter, the second signal S2 passes through the third bandpass filter 539, and then is input to the adder 542 via the second AGC unit 541.

The adder 542 outputs an output signal proportional to a sum of the first signal S1 and the second signal S2.

1.2.2. Basic Principle of Preprocessing

Next, a basic principle of the preprocessing in the preprocessing unit 53 will be described. In the following description, as an example, a system in which a frequency changes sinusoidally as a modulation signal and displacement of the object 14 also changes in an optical axis direction with simple vibration will be considered. Here, $E_m$, $E_d$, and $\varphi$ are represented as follows.

$$E_m = \alpha_m \{\cos(\omega_0 t + B \sin \omega_m t + \phi_m) + i \sin(\omega_0 t + B \sin \omega_m t + \phi_m)\} \tag{1}$$

$$E_d = a_d \{\cos(\omega_0 t + A \sin \omega_d t + \phi_d) + i \sin(\omega_0 t + A \sin \omega_d t + \phi_d)\} \tag{2}$$

$$\phi = \phi_m - \phi_d \tag{3}$$

A light detection signal $I_{PD}$ output from the current-voltage converter 531 is theoretically represented by the following formula.

$$I_{PD} = \langle |E_m + E_d|^2 \rangle = \langle |E_m{}^2 + E_d{}^2 + 2E_m E_d| \rangle = \tag{4}$$
$$a_m{}^2 + a_d{}^2 + 2a_m a_d \cos(B \sin\omega_m t - A \sin\omega_d t + \phi)$$

$E_m$, $E_d$, $\varphi_m$, $\varphi_d$, $\varphi$, $\omega_m$, $\omega_d$, $\omega_0$, $a_m$, and $a_d$ are as follows.
$E_m$ Electric field component of modulated signal derived from optical modulator
$E_d$ Electric field component of sample signal derived from measurement object
$\phi_m$: Initial phase of modulated signal derived from optical modulator
$\phi_d$: Initial phase of sample signal derived from measurement object
$\phi$: Optical path phase difference of laser interferometer
$\omega_m$: Angular frequency of modulated signal derived from optical modulator
$\omega_d$: Angular frequency of sample signal derived from measurement object
$\omega_0$: Angular frequency of emission light emitted from light source
$\alpha_m$ Coefficient
$\alpha_d$: Coefficient
< > in formula (4) represents a time average.
A first term and a second term of the above-described formula (4) represent a DC component. A third term represents an AC component. When the AC component is defined as $I_{PD \cdot AC}$ $I_{PD \cdot AC}$ is represented by the following formula.

$$I_{PD \cdot AC} = 2a_m a_d \cos(B \sin \omega_m t - A \sin \omega_d t + \phi) = \tag{5}$$

$$2a_m a_d \{\cos(B \sin \omega_m t)\cos(A \sin \omega_d t - \phi) + \sin((B \sin \omega_m t)\sin(A \sin \omega_d t - \phi)\}$$

$$A = \frac{f_{dmax}}{f_d} \tag{6}$$

$$B = \frac{f_{mmax}}{f_m} \tag{7}$$

$A$: Phase shift of sample signal $f_{dmax}$: Doppler frequency shift of sample signal $f_d$: Frequency of sample signal $B$: Phase shift of modulation signal $f_{mmax}$: Doppler frequency shift of modulation signal $f_m$: Frequency of modulation signal Here, ν-order Bessel functions such as the following formulas (8) and (9) are known.

$$\cos\{\zeta \sin(2\pi f_v t)\} = J_0(\zeta) + 2J_2(\zeta)\cos(2 \cdot 2\pi f_v t) + 2J_4(\zeta)\cos(4 \cdot 2\pi f_v t) + \tag{8}$$

$$\sin\{\zeta \sin(2\pi f_v t)\} = J_1(\zeta)\sin(1 \cdot 2\pi f_v t) + 2J_3(\zeta)\sin(3 \cdot 2\pi f_v t) + \tag{9}$$

When the above-described formula (5) is subjected to series expansion using the Bessel functions of the above-described formulas (8) and (9), the formula (5) can be transformed into the following formula (10).

$$I_{PD \cdot AC} = 2\alpha_m \alpha_d [\{J_0(B) + 2J_2(B)\cos(2 \cdot \omega_m t) + 2J_4(B)\cos(4 \cdot \omega_m t) + \ldots \}\cos(A \sin \omega_d t - \phi) - \{2J_1(B)\sin(1 \cdot \omega_m t) + 2J_3(B)\sin(3 \cdot \omega_m t) + \ldots \}\sin(A \sin \omega_d t - \phi)] \tag{10}$$

$J_0 (B)$, $J_1(B)$, $J_2(B)$, . . . are Bessel coefficients.

When transformed as described above, theoretically, it can be said that a band corresponding to a specific order can be extracted by a bandpass filter.

Therefore, in the preprocessing unit 53 described above, the preprocessing is performed on a light detection signal in the following flow based on this theory.

First, a light detection signal output from the current-voltage converter 531 is split into two signals, that is, the first signal S1 and the second signal S2 at the branch portion jp1. The first signal S1 passes through the first bandpass filter 534. A center angular frequency of the first bandpass filter 534 is set to $\omega_m$. Accordingly, the first signal S1 after passing through the first bandpass filter 534 is represented by the following formula.

$$I_{pass1} = J_1(B)\{-\cos(\omega_m t + A \sin \omega_d t - \phi) + \cos(\omega_m t - A \sin \omega_d t + \phi)\} = -2J_1(B)\sin(\omega_m t)\sin(A \sin \omega_d t - \phi) \tag{11}$$

On the other hand, the second signal S2 passes through the second bandpass filter 535. A center angular frequency of the second bandpass filter 535 is set to a value different from the center angular frequency of the first bandpass filter 534. Here, for example, the center angular frequency of the second bandpass filter 535 is set to 2 mm. Accordingly, the second signal S2 after passing through the second bandpass filter 535 is represented by the following formula.

$$I_{BPF2} = J_2(B)\cos(2 \cdot \omega_m t) \cdot \cos(A \sin \omega_d t - \phi) = \frac{1}{2}J_2(B)\{\cos(2 \cdot \omega_m t + \cos(A \sin \omega_d t - \phi)) + \cos(2 \cdot \omega_m t - \cos(A \sin \omega_d t - \phi))\} \tag{12}$$

The second signal S2 after passing through the second bandpass filter 535 is multiplied by the reference signal Ss by the multiplier 538. The second signal S2 after passing through the multiplier 538 is represented by the following formula.

$$I_{\cos(\omega_m t)} = \frac{1}{2}J_2(B) \tag{13}$$

$$\{\cos(2 \cdot \omega_m t + A \sin \omega_d t - \phi) + \cos(2 \cdot \omega_m t - A \sin \omega_d t + \phi)\} \cdot \cos(\omega_m t) =$$

$$\frac{1}{2}J_2(B)\{\cos(3 \cdot \omega_m t + A \sin \omega_d t - \phi) + \cos(1 \cdot \omega_m t - A \sin \omega_d t + \phi) +$$

$$\cos(3 \cdot \omega_m t - A \sin \omega_d t + \phi) + \cos(1 \cdot \omega_m t - A \sin \omega_d t + \phi)\}$$

The second signal S2 after passing through the multiplier 538 is passed through the third bandpass filter 539. A center angular frequency of the third bandpass filter 539 is set to the same value as the center angular frequency of the first bandpass filter 534. Here, for example, the center angular frequency of the third bandpass filter 539 is set to $\omega_m$. Accordingly, the second signal S2 after passing through the third bandpass filter 539 is represented by the following formula.

$$I_{pass2} = \frac{1}{2}J_2(B)\{\cos(\omega_m t + A \sin \omega_d t - \phi) + \cos(\omega_m t - A \sin \omega_m t + \phi)\} = J_2(B)\cos(\omega_m t)\cos(A \sin \omega_d t - \phi) \tag{14}$$

Thereafter, a phase of the first signal S1 represented by the above formula (11) is adjusted by the first delay adjuster 536, and an amplitude of the first signal S1 is adjusted by the first AGC unit 540.

An amplitude of the second signal S2 represented by the above formula (14) is adjusted by the second AGC unit 541. The amplitude of the second signal S2 is made equal to the amplitude of the first signal S1.

Then, the first signal S1 and the second signal S2 are added by the adder 542. An addition result is represented by the following formula (15).

$$I_{53} = \cos(\omega_m t + A \sin \omega_d t - \phi) \tag{15}$$

As shown in the above formula (15), as a result of the addition, an unnecessary term disappears, and a necessary term can be extracted. That is, an addition result $I_{53}$ represented by formula (15) is a signal obtained by extracting a frequency modulation component. The addition result $I_{53}$ is input to the demodulation processing unit 55.

1.2.3. Configuration of Demodulation Processing Unit

The demodulation processing unit 55 performs a demodulation processing of demodulating a sample signal derived from the object 14 from a signal output from the preprocessing unit 53. The demodulation processing is not particularly limited. A known quadrature detection method may be used. The quadrature detection method is a method of executing the demodulation processing by performing an operation of mixing external signals orthogonal to each other with an input signal.

The demodulation processing unit 55 shown in FIG. 1 is a digital circuit including a multiplier 551, a multiplier 552, a phase shifter 553, a first low-pass filter 555, a second low-pass filter 556, a divider 557, an arctangent calculator 558, and an output circuit 559.

The multipliers 551 and 552 are circuits that generate an output signal that is proportional to a product of two input signals. The phase shifter 553 is a circuit that generates an output signal by inverting a phase of an input signal without changing an amplitude of the input signal. Each of the first low-pass filter 555 and the second low-pass filter 556 is a filter that cuts off a signal in a high frequency band.

The divider 557 is a circuit that generates an output signal that is proportional to a quotient of two input signals. The arctangent calculator 558 is a circuit that outputs an arctangent of an input signal. The output circuit 559 calculates, based on a phase φ acquired by the arctangent calculator 558, a phase $\varphi_d$ as information derived from the object 14. By a phase unwrapping processing, the output circuit 559 performs phase coupling when there is a phase jump of $2\pi$ between two adjacent points. Then, the displacement of the object 14 is calculated based on obtained phase information. Accordingly, the function of serving as a displacement meter is implemented. A speed of the object 14 can be obtained based on the displacement. Accordingly, the function of serving as a speedometer is implemented.

The circuit configuration of the demodulation processing unit 55 described above is an example, the present disclosure is not limited thereto. For example, the demodulation processing unit 55 is not limited to a digital circuit, and may be an analog circuit. The analog circuit may include an F/V converter circuit or a $\Delta\Sigma$ counter circuit.

1.2.4. Demodulation Processing Performed by Demodulation Processing Unit

In the demodulation processing, first, a signal output from the preprocessing unit 53 is split into two signals at a branch portion jp2. The multiplier 551 multiplies one of the split signals by the reference signal Ss that is output from the oscillation circuit 54 and that is represented by $\cos(\omega_m t)$. The multiplier 552 multiplies the other split signal by a signal that is represented by $-\sin(\omega_m t)$ and that is obtained by the phase shifter 553 shifting a phase of the reference signal Ss output from the oscillation circuit 54 by $-90°$. The reference signal Ss and the signal obtained by shifting the phase of the reference signal Ss are signals whose phases are shifted from each other by 90°.

The signal passing through the multiplier 551 passes through the first low-pass filter 555, and is then input to the divider 557 as a signal x. The signal passing through the multiplier 552 passes through the second low-pass filter 556, and is then input to the divider 557 as a signal y. The divider 557 divides the signal y by the signal x, and an output y/x passes through the arctangent calculator 558 to obtain an output a tan(y/x).

Thereafter, the output a tan(y/x) is passed through the output circuit 559, so that the phase $\varphi_d$ is obtained as information derived from the object 14. By the phase unwrapping processing, the output circuit 559 performs the phase coupling when there is a phase jump of $2\pi$ between adjacent points. Then, the displacement of the object 14 can be calculated based on the phase information. Accordingly, the function of serving as a displacement meter is implemented. The speed can be calculated based on the displacement. Accordingly, the function of serving as a speedometer is implemented.

On the other hand, the output circuit 559 may be configured to obtain frequency information. The speed of the object 14 can be calculated based on the frequency information.

1.3. Correction Circuit

The correction circuit 56 detects an inertial force, which is a force acting on the vibration element 30, from a change in the vibration of the vibration element 30, and corrects a light reception signal based on a temporal change in an acceleration obtained from the inertial force. In the embodiment, the correction circuit 56 sequentially reads a frequency value of the reference signal Ss output from the oscillation circuit 54 that operates using the vibration element 30 as a signal source. Next, the correction circuit 56 detects a change in a resonance frequency of the vibration element 30 from a change in the frequency value, and obtains an acceleration from a change amount. Then, the correction circuit 56 corrects the light reception signal based on the temporal change of the acceleration. Accordingly, even when the vibration as the disturbance is applied to the laser interferometer 1, the influence of the disturbance can be removed from the measurement result of the object 14 or the influence of the disturbance can be reduced. As a result, the displacement and the speed of the object 14 are measured with higher accuracy.

The above-described functions of the correction circuit 56 are implemented by, for example, hardware including a processor, a memory, an external interface, an input unit, a display unit, and the like, similarly to the demodulation circuit 52.

1.3.1. Configuration of Correction Circuit

The correction circuit 56 shown in FIG. 1 includes a frequency counter 561, an acceleration converter 562, a sensitivity adjustment unit 563, Fourier transform units 564 and 565, and a subtractor 566.

The frequency counter 561 measures a frequency of the reference signal Ss output from the ADC 533.

The acceleration converter 562 performs calculation on the frequency of the reference signal Ss measured by the frequency counter 561, and calculates an acceleration applied to the vibration element 30. Accordingly, an acceleration time signal Xa(t) representing a temporal change of the acceleration applied to the vibration element 30 is output from the acceleration converter 562.

The sensitivity adjustment unit 563 adjusts a detection sensitivity of the acceleration. Accordingly, an amplitude of the acceleration time signal Xa(t) output from the acceleration converter 562 is adjusted.

The Fourier transform unit 564 performs Fourier transform on the acceleration time signal Xa(t) output from the sensitivity adjustment unit 563, and performs spectrum analysis. Accordingly, the acceleration time signal Xa(t) is represented in a frequency space, and an acceleration frequency spectrum Sa(f) is obtained.

The Fourier transform unit 565 performs the Fourier transform on an output signal output from the output circuit 559 and performs the spectrum analysis. When the output signal output from the output circuit 559 is, for example, a demodulated displacement time signal Xd(t) of the object 14, the demodulated displacement time signal Xd(t) is represented in a frequency space by the Fourier transform, and a demodulated displacement frequency spectrum Sd(f) is obtained.

The subtractor 566 performs a subtraction processing of subtracting an acceleration frequency spectrum Sa(f) from the demodulated displacement frequency spectrum Sd(f). Accordingly, a corrected displacement frequency spectrum Sr(f) is obtained. Then, the corrected displacement frequency spectrum Sr(f) is output as an output signal of the correction circuit 56.

The configuration of the correction circuit 56 is not limited to the above. The correction circuit 56 may be, for example, a circuit including a reciprocating counter or a circuit including a $\Delta\Sigma$ converter. Depending on the configuration of the correction circuit 56, the analog signal output from the oscillation circuit 54 may be input to the correction circuit 56.

1.3.2. Correction Processing by Correction Circuit

Figure 8:
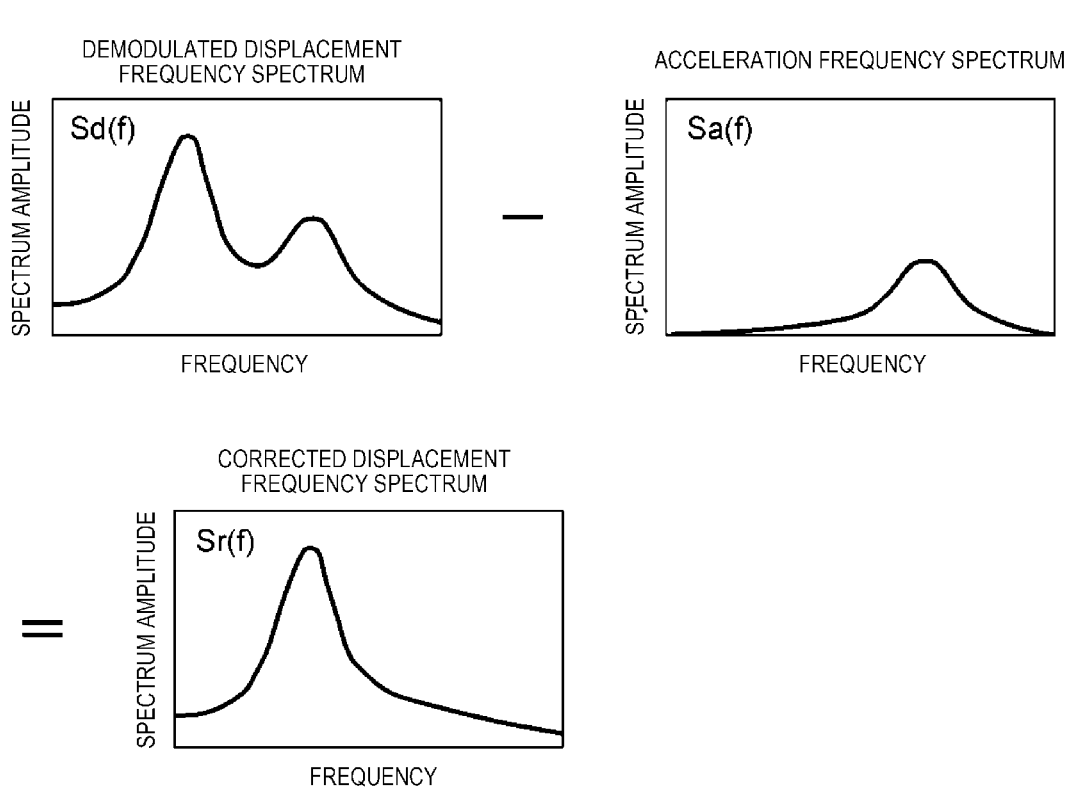
FIG. 8 is a diagram showing a concept of a correction processing by a correction circuit in FIG. 1.

FIG. 8 is a diagram showing a concept of the correction processing by the correction circuit 56 in FIG. 1.

In the correction processing, as shown in FIG. 8, the acceleration frequency spectrum Sa(f) is subtracted from the demodulated displacement frequency spectrum Sd(f). The acceleration frequency spectrum Sa(f) represents a time signal of the acceleration (acceleration time signal Xa(t)) applied to the vibration element 30 in a frequency space, and indicates a frequency characteristic of the acceleration. It is considered that the acceleration applied to the vibration element 30 is equal to the acceleration applied to the laser interferometer 1. The acceleration applied to the laser interferometer 1 becomes a disturbance that lowers the measurement accuracy of the object 14. Examples of the acceleration applied to the laser interferometer 1 include an acceleration due to the vibration applied to a room or a building in which the laser interferometer 1 is placed. Since the measurement accuracy of the object 14 by the laser interferometer 1 is as high as the order of nm, such vibration causes a decrease in the measurement accuracy.

The demodulated displacement frequency spectrum Sd(f) obtained from the demodulated displacement time signal Xd(t) output from the output circuit 559 includes the influence of the disturbance on the frequency. Therefore, by subtracting the acceleration frequency spectrum Sa(f) from the demodulated displacement frequency spectrum Sd(f), the influence of the disturbance can be removed or reduced. Accordingly, the corrected displacement frequency spectrum Sr(f) can be obtained, in which the influence of the disturbance is removed or reduced.

Although a signal output from the correction circuit 56 shown in FIG. 1 is the corrected displacement frequency spectrum Sr(f), inverse Fourier transform may be performed on the corrected displacement frequency spectrum Sr(f) to obtain a corrected displacement time signal Xr(t). Since the obtained corrected displacement time signal Xr(t) is designed to reduce the influence of the disturbance, the measurement accuracy is improved as compared with the case where the correction is not performed.

The correction processing is not limited to the above method. For example, the acceleration time signal Xa(t) may be subtracted from the demodulated displacement time signal Xd(t). In this case, the corrected displacement time signal Xr(t) is obtained without performing the inverse Fourier transform. The influence of the disturbance may be removed or reduced using a known detection algorithm for removing body motion noise built in a vital sensor or the like.

When a signal generator such as a function generator or a signal generator is used instead of the oscillation circuit 54, the acceleration time signal Xa(t) may be acquired through a path different from that of the reference signal Ss, and may be subjected to the correction processing.

On the other hand, when the oscillation circuit 54 is used, the acceleration can be detected from the reference signal Ss. Accordingly, since the circuit configuration of the correction circuit 56 is simplified, the cost of the laser interferometer 1 can be easily reduced.

1.4. Effects of First Embodiment

As described above, the laser interferometer 1 according to the embodiment includes the laser light source 2, the optical modulator 12, the light receiving element 10, the demodulation circuit 52, and the correction circuit 56.

The laser light source 2 emits the emission light L1 (first laser light). The optical modulator 12 includes the vibration element 30, modulates the emission light L1 by using the vibration element 30, and generates the reference light L2 (second laser light) including a modulation signal. The light receiving element 10 receives the object light L3 (third laser light) including a sample signal generated by the emission light L1 being reflected by the object 14, and the reference light L2, and outputs a light reception signal. The demodulation circuit 52 demodulates the sample signal from the light reception signal. The correction circuit 56 detects an inertial force as a force acting on the vibration element 30 from a change in the vibration of the vibration element 30, and corrects the demodulation displacement time signal Xd(t) (corrects the light reception signal) based on the inertial force.

According to such a configuration, even when the acceleration as the disturbance is applied to the laser interferometer 1, the influence of the disturbance can be removed from the measurement result of the object 14 or the influence of the disturbance can be reduced. Accordingly, laser interferometer 1 capable of measuring the displacement and the speed of the object 14 with higher accuracy can be implemented. The vibration element 30 has a fairly small volume, and electric power required for the oscillation is also small. Therefore, it is possible to easily reduce the size of the laser interferometer 1. Further, the vibration element 30 can be used not only for frequency modulation of the emission light L1, but also can function as an acceleration sensor. Therefore, the correction processing as described above can be performed without newly providing an acceleration sensor. Therefore, it is possible to further reduce the size and the cost of the laser interferometer 1 while achieving high accuracy of the laser interferometer 1.

The correction circuit 56 detects an inertial force as a force acting on the vibration element 30 in accordance with the acceleration.

Accordingly, for example, the acceleration applied to the laser interferometer 1 due to the vibration can be detected, and the correction processing can be performed. As a result, the influence of the vibration can be accurately corrected. The laser interferometer 1 having excellent resistance to the disturbance such as the vibration can be implemented.

A linear axis corresponding to the direction of the acceleration when the inertial force acts on the vibration element 30 is the acceleration detection axis A1 as described above. The acceleration detection axis A1 is preferably parallel to the incident optical axis of the emission light L1 (first laser light) incident on the object 14.

Accordingly, it is possible to more accurately detect the acceleration that affects the measurement accuracy of the object 14. As a result, the measurement accuracy of the object 14 can be further improved.

The laser interferometer 1 according to the embodiment includes the oscillation circuit 54. The oscillation circuit 54 operates using the vibration element 30 as a signal source, and outputs the reference signal Ss to the demodulation circuit 52. The demodulation circuit 52 demodulates the sample signal derived from the object 14 from the light reception signal based on the reference signal Ss.

According to such a configuration, even when the natural frequency $f_Q$ of the vibration element 30 fluctuates, the oscillation frequency $f_{osc}$ of the oscillation circuit 54 can be changed to a value corresponding to the natural frequency $f_Q$ of the vibration element 30. Therefore, the vibration of the vibration element 30 can be easily stabilized. Accordingly, the demodulation accuracy of the sample signal in the demodulation circuit 52 can be improved.

Since the vibration element 30 serves as a signal source of the oscillation circuit 54, the temperature characteristic of the modulation signal and the temperature characteristic of the reference signal Ss can be made to correspond to the temperature characteristic of the vibration element 30. Since both the modulation signal and the reference signal Ss are processed in real time by the demodulation circuit 52, a behavior of fluctuation of the modulation signal accompanying a temperature change and a behavior of fluctuation of the reference signal Ss accompanying the temperature change coincide with or approximate to each other. Therefore, even when the temperature of the vibration element 30 changes, the influence on the demodulation accuracy can be prevented, and the demodulation accuracy of the sample signal derived from the object 14 can be improved. Accordingly, the laser interferometer 1 having excellent resistance to the disturbance can be implemented.

2. Second Embodiment

Next, a laser interferometer according to a second embodiment will be described.

Figure 10:
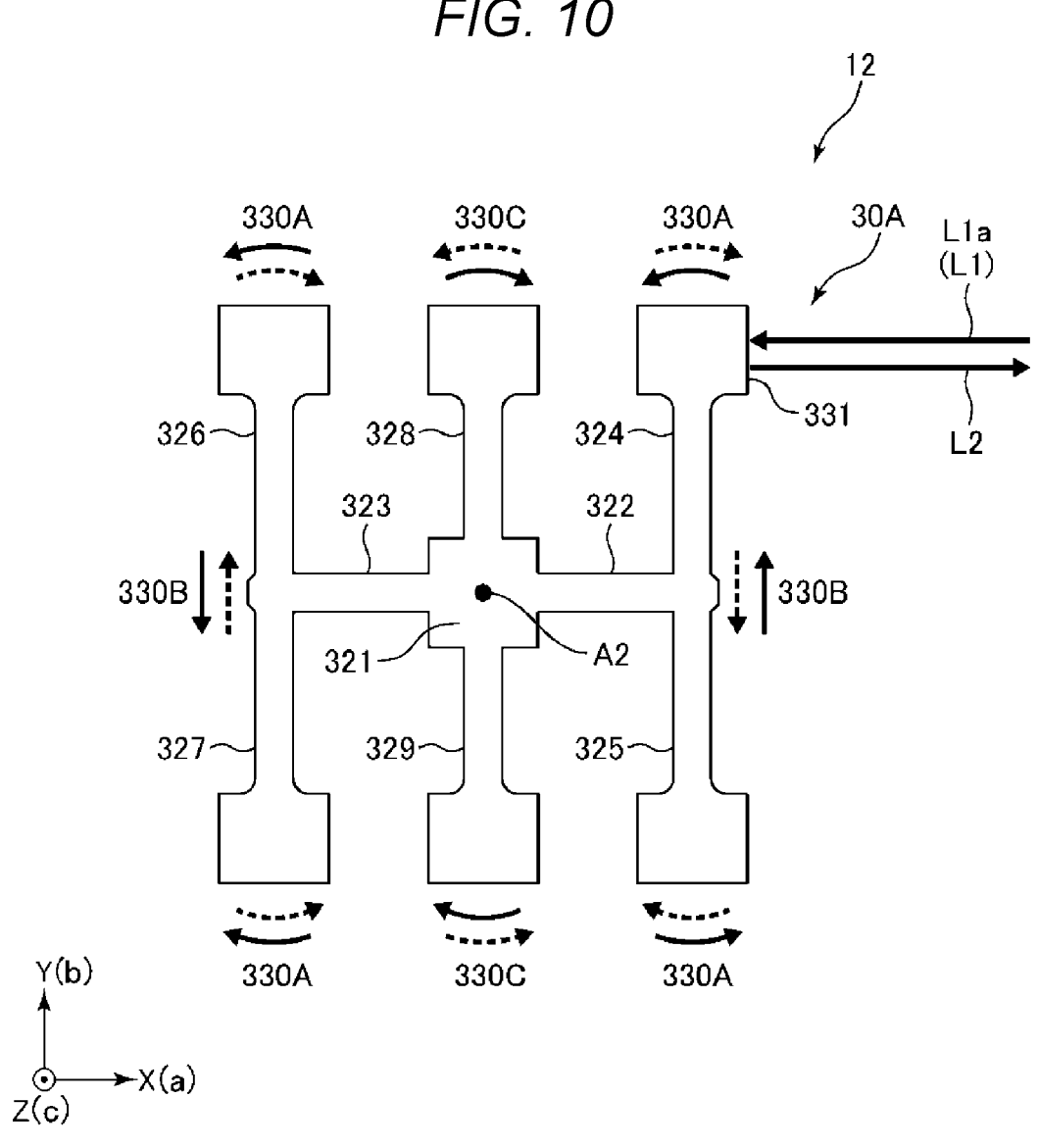
FIG. 10 is a plan view showing an optical modulator in FIG. 9.

FIG. 9 is a functional block diagram showing the laser interferometer 1 according to the second embodiment. FIG. 10 is a plan view showing the optical modulator 12 in FIG. 9. In FIG. 10, an X axis, a Y axis, and a Z axis are set as three axes orthogonal to one another, and are indicated by arrows. A tip end side of an arrow is defined as "plus". A base end side of the arrow is defined as "minus". For example, both a plus side direction and a minus side direction of the X axis are referred to as an "X-axis direction". The same applies to a Y-axis direction and a Z-axis direction.

Hereinafter, although the second embodiment will be described, in the following description, differences from the first embodiment will be mainly described, and description of similar matters will be omitted. In the drawings, the same components as those of the first embodiment are denoted by the same reference numerals.

The laser interferometer 1 according to the second embodiment is the same as the laser interferometer 1 according to the first embodiment except that configurations of a vibration element 30A shown in FIG. 10 and a correction circuit 56A shown in FIG. 9 are different.

In the laser interferometer 1 according to the second embodiment, the vibration element 30A is used not only for frequency modulation of the emission light L1, but also has a function as an angular velocity sensor (gyro sensor). When an angular velocity is applied to the vibration element 30A, a resonance frequency of the vibration element 30A changes with a change in a Coriolis force, and the angular velocity is obtained from a change amount. The correction circuit 56A corrects a light reception signal based on the angular velocity.

2.1. Vibration Element

The optical modulator 12 shown in FIG. 10 includes the vibration element 30A. The vibration element 30A is, for example, a double T-shaped quartz crystal vibrator. The vibration element 30A includes a quartz crystal element having a double T shape, an electrode, which is not shown, and a light reflecting surface 331. The quartz crystal element is manufactured by processing, for example, a quartz crystal Z plate. The quartz crystal element includes a base portion 321, coupling arms 322 and 323, drive arms 324, 325, 326, and 327, and detection arms 328 and 329.

The base portion 321 has a rectangular shape. The detection arm 328 extends from the base portion 321 toward a Y-axis plus side. The detection arm 329 extends from the base portion 321 toward a Y-axis minus side. The coupling arm 322 extends from the base portion 321 toward an X-axis plus side. The coupling arm 323 extends toward an X-axis minus side.

The drive arm 324 extends from a tip end portion of the coupling arm 322 toward the Y-axis plus side. The drive arm 325 extends from the tip end portion of the coupling arm 322 toward the Y-axis minus side. The drive arm 326 extends from a tip end portion of the coupling arm 323 toward the Y-axis plus side. The drive arm 327 extends from the tip end portion of the coupling arm 323 toward the Y-axis minus side.

Each of the drive arms 324, 325, 326, and 327 is provided with a drive electrode which is not shown. Each of the detection arms 328 and 329 is provided with a detection electrode which is not shown. When a drive signal of the drive electrode is input, the drive arms 324, 325, 326, and 327 perform bending vibration as indicated by an arrow 330A in FIG. 10. Specifically, the drive arms 324 and 326 are bent so as to repeatedly separate from and approach each other. The drive arms 325 and 327 are also bent so as to repeatedly separate from and approach each other. That is, the drive arms 324, 325, 326, and 327 are bent and vibrated in the X-axis direction.

The light reflecting surface 331 is provided on a surface parallel to a Y-Z plane of the drive arm 324, and has a function of reflecting the emission light L1. The light reflecting surface 331 may be provided on a surface of another drive arm. The light reflecting surface 331 may be a surface of an electrode, which is not shown, provided on these surfaces, or may be a surface of a light reflecting film provided separately from the electrode.

When the drive arm 324 is bent and vibrated in the X-axis direction, the light reflecting surface 331 is also vibrated in the X-axis direction. In this state, when the emission light L1 is incident on the light reflecting surface 331, interaction occurs between the vibration of the light reflecting surface 331 and the frequency of the emission light L1. Accordingly, it is possible to implement the optical modulator 12 that performs the frequency modulation of the emission light L1. As a result, the reference light L2 can be generated from the emission light L1. Therefore, the optical modulator 12 including the vibration element 30A shown in FIG. 10 is installed such that the X axis in FIG. 10 and the a axis in FIG. 2 are preferably parallel to each other. For example, the optical modulator 12 may be installed such that the X axis in FIG. 10 and the b axis in FIG. 2 are preferably parallel to each other.

A length of the vibration element 30A in the Y-axis direction is, for example, about 0.2 mm or more and 5.0 mm or less. A thickness of the vibration element 30A in the Z-axis direction is, for example, about 0.003 mm or more and 0.5 mm or less.

The vibration element 30A may be a vibration element having a vibration mode other than the bending vibration.

The vibration element 30A is used not only for the frequency modulation of the emission light L1, but also has a function as an angular velocity sensor (gyro sensor).

In a state in which the drive arms 324, 325, 326, and 327 are bent and vibrated in the X-axis direction, when an angular velocity with the Z axis as a rotation axis is applied, for example, a Coriolis force in a direction indicated by an arrow 330B acts on the drive arms 324, 325, 326, and 327. When the Coriolis force acts on the drive arms 324, 325, 326, and 327, a vibration component in the direction of the arrow 330B is generated. The vibration component is transmitted to the base portion 321 via the coupling arms 322 and 323. The detection arms 328 and 329 are bent and vibrated in a direction of an arrow 330C. The bending vibration is detected by a detection electrode. A detection signal output from the detection electrode is a signal corresponding to the angular velocity applied to the vibration element 30A. Therefore, the angular velocity can be obtained from the detection signal. Accordingly, the vibration element 30A can function as an angular velocity sensor.

The correction circuit 56A to be described later corrects the light reception signal based on the angular velocity obtained from the Coriolis force. Accordingly, the displacement and the speed of the object 14 are measured with higher accuracy.

Of angular velocities applied to the laser interferometer 1, an angular velocity having an axis orthogonal to an incident optical axis of the emission light L1 incident on the object 14 as a rotation axis greatly affects a measurement result of the object 14. Therefore, it is preferable to dispose the vibration element 30A such that the rotation axis of the detected angular velocity is orthogonal to the incident optical axis of the emission light L1 with respect to the object 14. Accordingly, it is possible to more accurately detect the angular velocity that affects the measurement accuracy of the object 14. As a result, the measurement accuracy of the object 14 can be further improved.

Examples of a situation in which the angular velocity is applied to the laser interferometer 1 include a situation in which the vibration is applied to a room or a building in which the laser interferometer 1 is placed. When the vibration is applied, the angular velocity applied to the laser interferometer 1 changes with time. At this time, since a change also occurs in the vibration of the vibration element 30A, a temporal change of the angular velocity can be obtained based on the change.

For example, in a robot that performs various operations on a workpiece using a robot arm, since the vibration occurs when the robot arm is driven, there is a problem that the robot arm cannot be shifted to the next operation until the vibration stops. By attaching the laser interferometer 1 to the robot arm, it is possible to sufficiently accurately measure a displacement between the robot arm and the workpiece while correcting the influence of the vibration. Then, since the driving of the robot arm can be controlled based on a measurement result, it is possible to cause the robot arm to start the next operation without waiting for the vibration to stop.

The vibration element 30A shown in FIG. 10 is not only used for the frequency modulation of the emission light L1, but also can function as an angular velocity sensor (gyro sensor).

In the case of the vibration element 30A shown in FIG. 10, an angular velocity detection axis A2 is parallel to the Z axis. Further, the incident optical axis of the emission light L1 incident on the object 14 is parallel to the a-axis in FIG. 2. Therefore, a posture in which the X axis in FIG. 10 and the a axis in FIG. 2 are parallel to each other is a preferred posture in detection of the vibration or the like that greatly affects the measurement result of the object 14. Therefore, the light reception signal can be accurately corrected based on the angular velocity detected by the angular velocity sensor, and the measurement accuracy of the object 14 can be improved.

The posture of the optical modulator 12 is not limited to the above-described posture. The optical modulator 12 may be installed in a posture in which the Z axis (angular velocity detection axis A2) in FIG. 10 and the a axis in FIG. 2 are orthogonal to each other, for example, a posture in which the Z axis in FIG. 10 and the b axis or the c axis in FIG. 2 are parallel to each other. In other words, it is sufficient that the Z axis in FIG. 10 is parallel to a b-c plane of FIG. 2.

The vibration element 30A is not limited to the double T-shaped quartz crystal vibrator, and may be various quartz crystal vibrators such as a tuning fork type quartz crystal vibrator and an H-shaped quartz crystal vibrator.

The vibration element 30A is not limited to a quartz crystal vibrator, and may be a silicon vibrator or a ceramic vibrator. By using a self-excited oscillation vibrator as the vibration element 30A, a modulation signal can be stabilized, and the oscillation circuit 54 operating with the vibration element 30A as a signal source can output the reference signal Ss having higher accuracy.

The optical modulator 12 shown in FIG. 10 may have a package structure as described above.

2.2. Correction Circuit

The correction circuit 56A shown in FIG. 9 detects a Coriolis force, which is a force acting on the vibration element 30A, from a change in the vibration of the vibration element 30A, and corrects a light reception signal based on a temporal change in an angular velocity obtained from the Coriolis force. Accordingly, even when the vibration as the disturbance is applied to the laser interferometer 1, the influence of the disturbance can be removed from the measurement result of the object 14 or the influence of the disturbance can be reduced. As a result, the displacement and the speed of the object 14 can be measured with higher accuracy.

The correction circuit 56A shown in FIG. 9 includes an angular velocity detection unit 57 and a correction processing unit 58.

2.2.1. Angular Velocity Detection Unit

First, the angular velocity detection unit 57 will be described.

The angular velocity detection unit 57 shown in FIG. 9 is a circuit that amplifies a detection signal from the vibration element 30A and outputs the detection signal as a DC signal to the correction processing unit 58.

The angular velocity detection unit 57 includes charge amplifiers 571 and 572, a differential amplifier 573, a high-pass filter 574, an AC amplifier 575, a synchronous detection unit 576, a GC amplifier 577, a low-pass filter 578, an output amplifier 579, and an ADC 580.

For example, the charge amplifiers 571 and 572 convert detection signals, which are alternating currents output from the detection arms 328 and 329, into AC voltage signals and output the AC voltage signals.

The differential amplifier 573 differentially amplifies a signal pair including an output signal of the charge amplifier 571 and an output signal of the charge amplifier 572. In the case of the double T-shaped quartz crystal vibrator, since the alternating currents output from the detection arms 328 and 329 are opposite in phase to each other, necessary signal components are amplified by differential amplification, and unnecessary in-phase components are offset or reduced.

The high-pass filter 574 is a filter that selectively passes a component having a frequency higher than a shielding frequency in the output signal of the differential amplifier 573.

The AC amplifier 575 amplifies an output signal of the high-pass filter 574.

The synchronous detection unit 576 uses the output signal of the AC amplifier 575 as a signal to be detected, and performs synchronous detection using a detection signal. In the example of FIG. 9, the reference signal Ss output from the oscillation circuit 54 is used as the detection signal. By the synchronous detection, an angular velocity signal phase component included in the output signal from the AC amplifier 575 is extracted and subjected to DC conversion.

The GC amplifier 577 is a gain control amplifier, and amplifies or attenuates the output signal of the synchronous detection unit 576 to adjust a variation in detection sensitivity.

The low-pass filter 578 is a filter that selectively passes a component having a frequency lower than the shielding frequency in the output signal of the GC amplifier 577.

The output amplifier 579 amplifies an output signal of the low-pass filter 578.

The ADC 580 is an analog-to-digital converter, and converts an analog signal into a digital signal at a predetermined sampling bit rate. Accordingly, an angular velocity time signal representing a temporal change in the angular velocity applied to the vibration element 30A is obtained.

An arrangement of the angular velocity detection unit 57 is not particularly limited. The angular velocity detection unit 57 is preferably the sensor head unit 51. Accordingly, since a physical distance between the detection arms 328 and 329 and the angular velocity detection unit 57 can be shortened, noise is less likely to be mixed into the detection signals output from the detection arms 328 and 329.

2.2.2. Correction Processing Unit

Next, the correction processing unit 58 will be described.

2.2.2.1. Configuration of Correction Processing Unit

The correction processing unit 58 shown in FIG. 9 includes a sensitivity adjustment unit 581, Fourier transform units 582 and 583, and a subtractor 584.

The sensitivity adjustment unit 581 adjusts a detection sensitivity of the angular velocity. Accordingly, an amplitude of an angular velocity time signal Xav(t) output from the angular velocity detection unit 57 is adjusted.

The Fourier transform unit 582 performs Fourier transform on the angular velocity time signal Xav(t) output from the sensitivity adjustment unit 581, and performs spectrum analysis. Accordingly, the angular velocity time signal Xav (t) is represented in a frequency space, and an angular velocity frequency spectrum Sav(f) is obtained.

The Fourier transform unit 583 performs the Fourier transform on an output signal output from the output circuit 559 and performs the spectrum analysis. When the output signal output from the output circuit 559 is, for example, a demodulated displacement time signal Xd(t) of the object 14, the demodulated displacement time signal Xd(t) is represented in a frequency space by the Fourier transform, and a demodulated displacement frequency spectrum Sd(f) is obtained.

The subtractor 584 performs a subtraction processing of subtracting an angular velocity frequency spectrum Sav(f) from the demodulated displacement frequency spectrum Sd(f). Accordingly, a corrected displacement frequency spectrum Sr(f) is obtained. The obtained corrected displacement frequency spectrum Sr(f) is output as an output signal of the correction circuit 56A.

The configuration of the correction circuit 56A is not limited to the above.

2.2.2.2. Correction Processing by Correction Processing Unit

Figure 11:
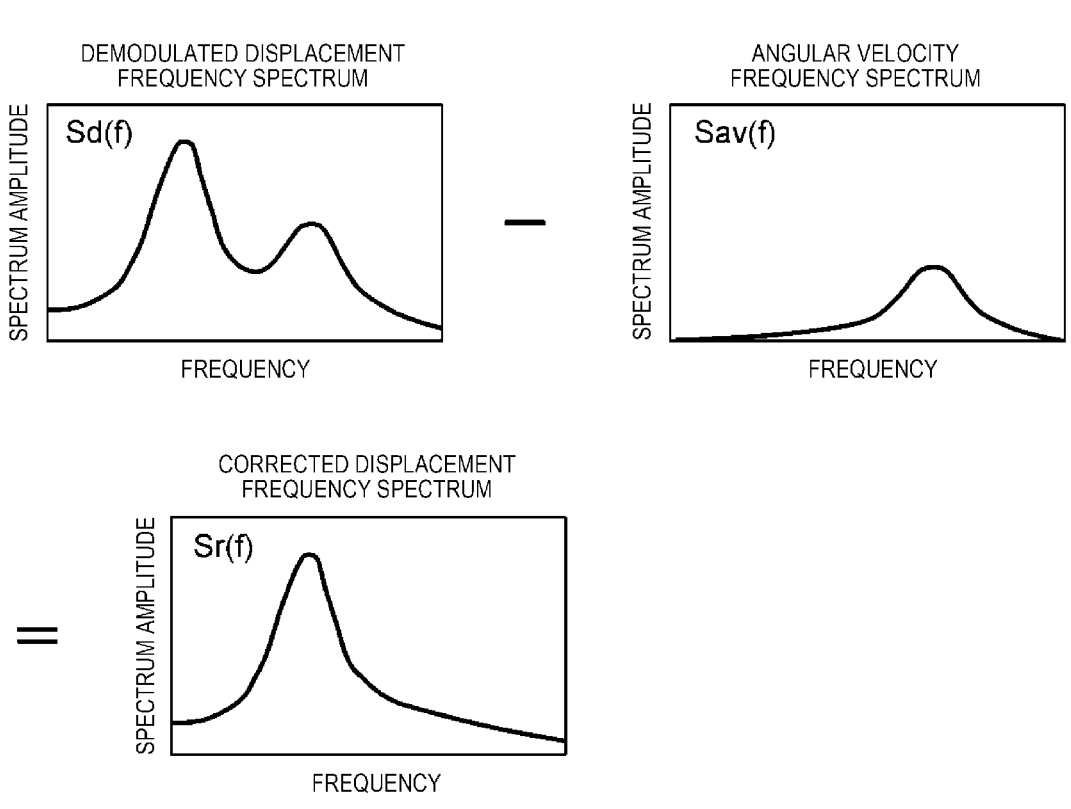
FIG. 11 is a diagram showing a concept of a correction processing by a correction circuit in FIG. 9.

FIG. 11 is a diagram showing a concept of a correction processing by the correction circuit 56A in FIG. 9.

In the correction processing, as shown in FIG. 11, the angular velocity frequency spectrum Sav(f) is subtracted from the demodulated displacement frequency spectrum Sd(f). The angular velocity frequency spectrum Sav(f) represents a time signal of the angular velocity (angular velocity time signal Xav(t)) applied to the vibration element 30A in a frequency space, and indicates a frequency characteristic of the angular velocity. It is considered that the angular velocity applied to the vibration element 30A is equal to the angular velocity applied to the laser interferometer 1. The angular velocity applied to the laser interferometer 1 becomes a disturbance that lowers the measurement accuracy of the object 14. Examples of the angular velocity applied to the laser interferometer 1 include an angular velocity due to the vibration applied to a room or a building in which the laser interferometer 1 is placed.

The demodulated displacement frequency spectrum Sd(f) obtained from the demodulated displacement time signal Xd(t) output from the output circuit 559 includes the influence of the disturbance on the frequency. Therefore, by subtracting the angular velocity frequency spectrum Sav(f) from the demodulated displacement frequency spectrum Sd(f), the influence of the disturbance can be removed or reduced. Accordingly, the corrected displacement frequency spectrum Sr(f) can be obtained, in which the influence of the disturbance is removed or reduced.

Although a signal output from the correction circuit 56A shown in FIG. 9 is the corrected displacement frequency spectrum Sr(f), inverse Fourier transform may be applied to the corrected displacement frequency spectrum Sr(f) to obtain a corrected displacement time signal Xr(t). Since the obtained corrected displacement time signal Xr(t) is designed to reduce the influence of the disturbance, the measurement accuracy is improved as compared with the case where the correction is not performed.

2.3. Effects of Second Embodiment

As described above, the laser interferometer 1 according to the embodiment includes the laser light source 2, the optical modulator 12, the light receiving element 10, the demodulation circuit 52, and the correction circuit 56A.

The laser light source 2 emits the emission light L1 (first laser light). The optical modulator 12 includes the vibration element 30A, modulates the emission light L1 by using the vibration element 30A, and generates the reference light L2 (second laser light) including a modulation signal. The light receiving element 10 receives the object light L3 (third laser light) including a sample signal generated by the emission light L1 being reflected by the object 14, and the reference light L2, and outputs a light reception signal. The demodulation circuit 52 demodulates the sample signal from the light reception signal. The correction circuit 56A detects the Coriolis force as a force acting on the vibration element 30A from the change in the vibration of the vibration element 30A, and corrects the demodulation displacement time signal Xd(t) (corrects the light reception signal) based on the Coriolis force.

According to such a configuration, even when the angular velocity as the disturbance is applied to the laser interferometer 1, the influence of the disturbance can be removed from the measurement result of the object 14 or the influence of the disturbance can be reduced. Accordingly, laser interferometer 1 capable of measuring the displacement and the speed of the object 14 with higher accuracy can be implemented. The vibration element 30A has a fairly small volume, and electric power required for the oscillation is also small. Therefore, it is possible to easily reduce the size of the laser interferometer 1. The vibration element 30A can be used not only for the frequency modulation of the emission light L1, but also can function as an angular velocity sensor (gyro sensor). Therefore, the correction processing as described above can be performed without newly providing an angular velocity sensor. Therefore, it is possible to further reduce the size and the cost of the laser interferometer 1 while achieving high accuracy of the laser interferometer 1.

The correction circuit 56A detects the Coriolis force as a force acting on the vibration element 30A according to the angular velocity.

Accordingly, for example, the angular velocity applied to the laser interferometer 1 due to the vibration can be detected, and the correction processing can be performed. As a result, the influence of the vibration can be accurately corrected. The laser interferometer 1 having excellent resistance to the disturbance such as the vibration can be implemented.

A rotation axis corresponding to a direction of the angular velocity when the Coriolis force acts on the vibration element 30A is the angular velocity detection axis A2 as described above. The angular velocity detection axis A2 is preferably orthogonal to the incident optical axis of the emission light L1 (first laser light) incident on the object 14.

Accordingly, it is possible to more accurately detect the angular velocity that affects the measurement accuracy of the object 14. As a result, the measurement accuracy of the object 14 can be further improved.

In the second embodiment as described above, the same effects as those of the first embodiment can also be obtained.

3. Third Embodiment

Next, a laser interferometer according to a third embodiment will be described.

Figure 12:
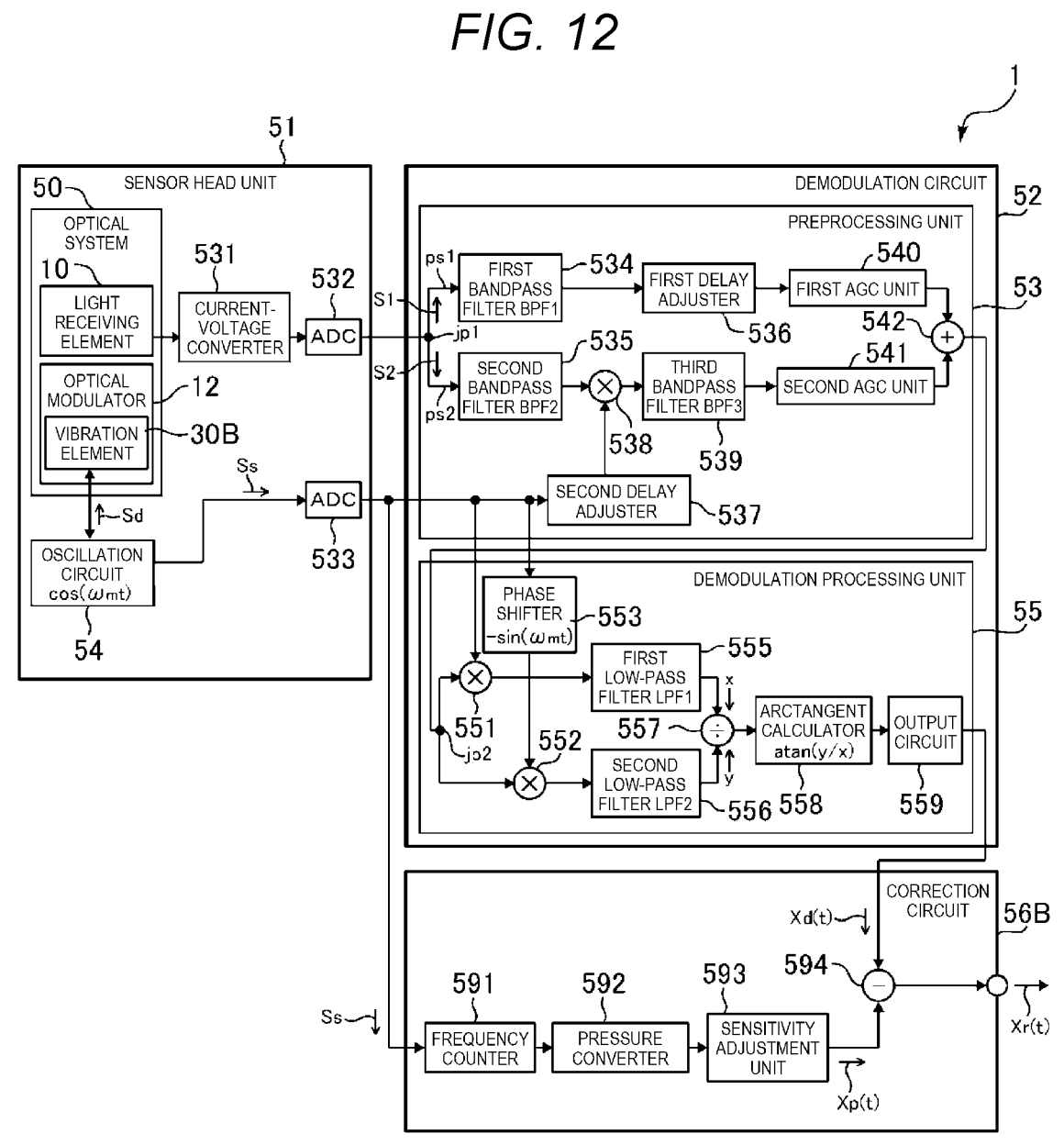
Figure 13:
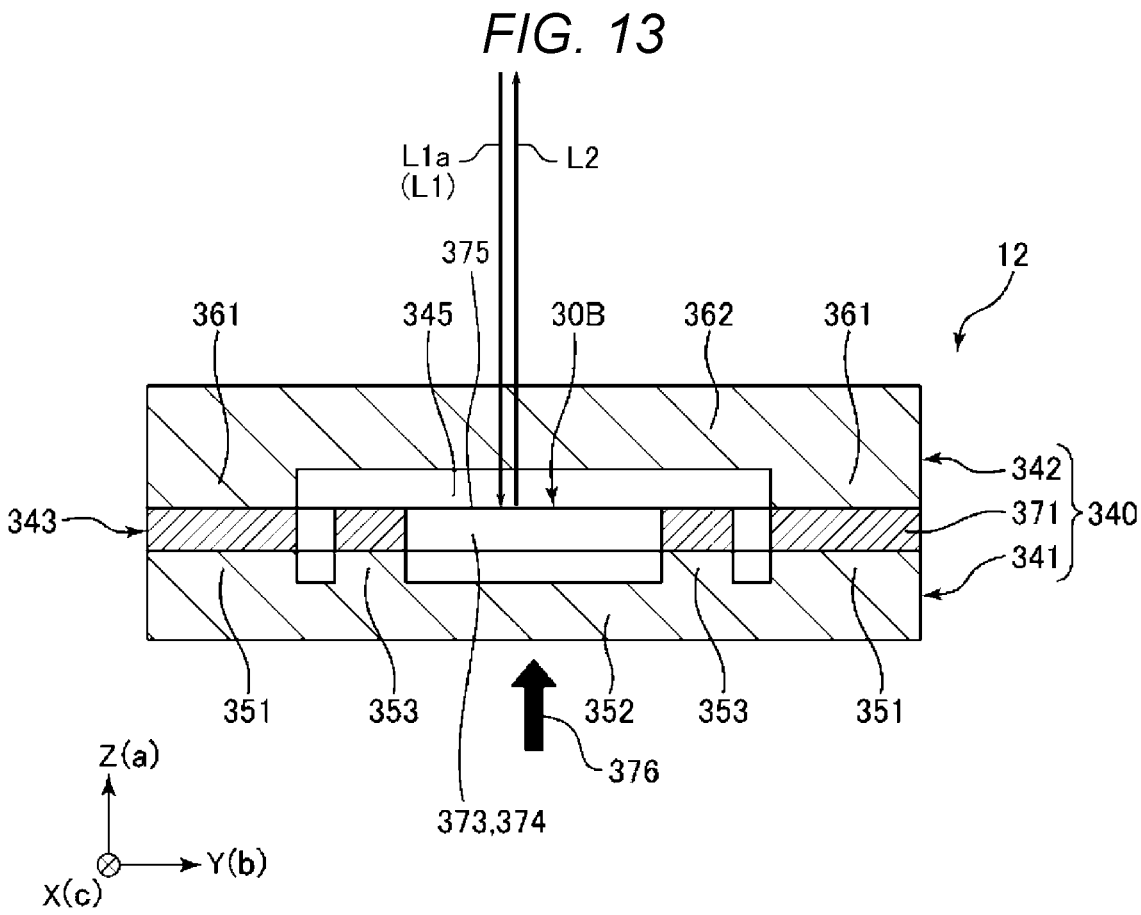
FIG. 13 is a cross-sectional view showing an optical modulator in FIG. 12.
Figure 14:
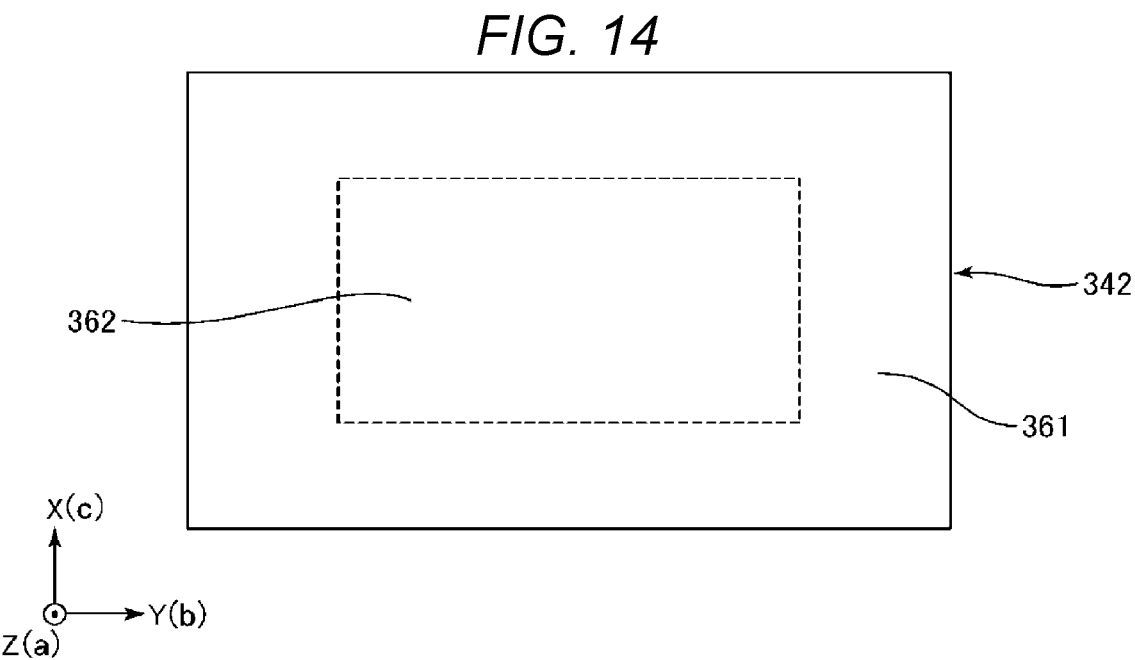
FIG. 14 is an exploded plan view of the optical modulator shown in FIG. 13.
Figure 15:
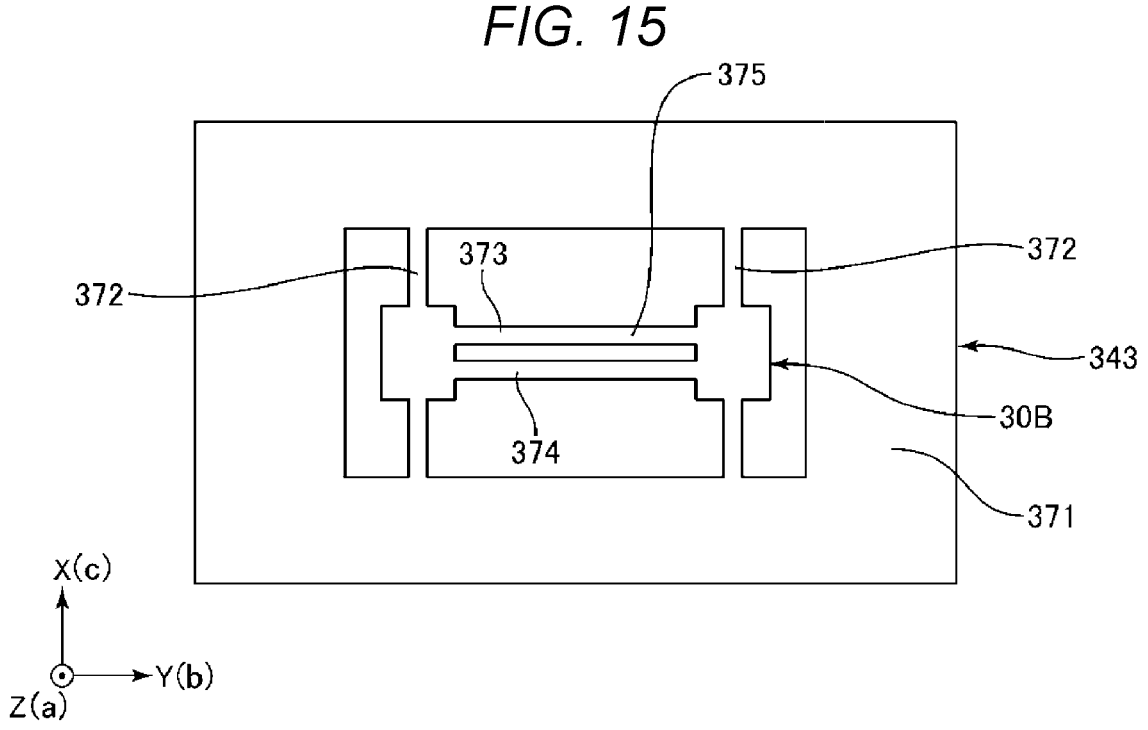
FIG. 15 is an exploded plan view of the optical modulator shown in FIG. 13.
Figure 16:
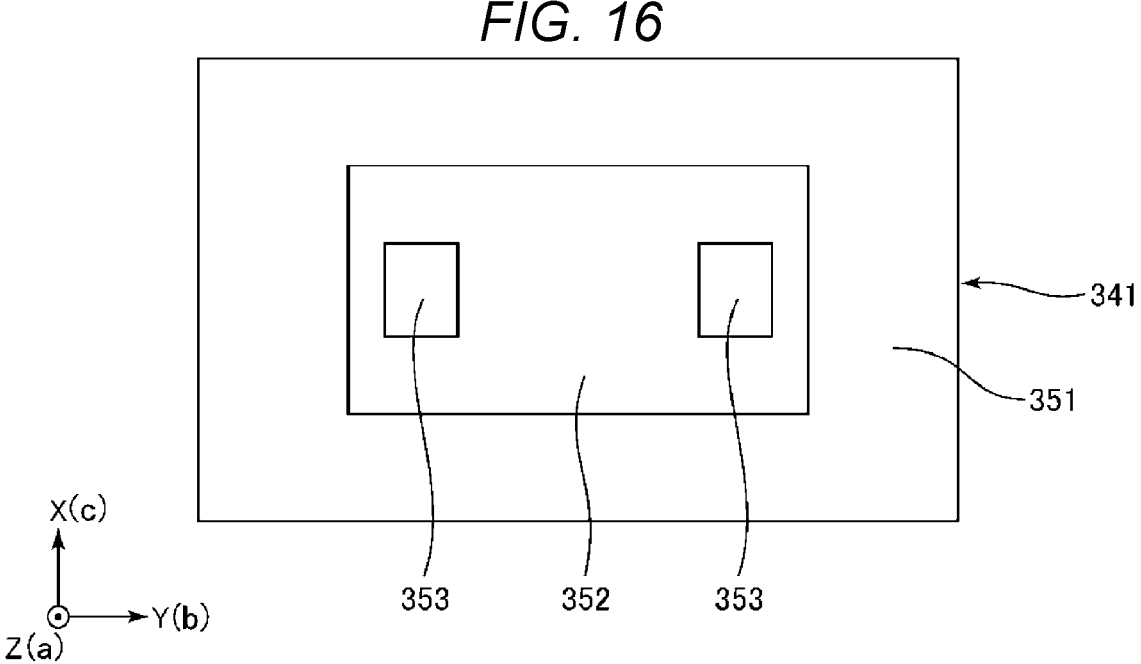
FIG. 16 is an exploded plan view of the optical modulator shown in FIG. 13.

FIG. 12 is a functional block diagram showing the laser interferometer 1 according to the third embodiment. FIG. 13 is a cross-sectional view showing the optical modulator 12 in FIG. 12. FIGS. 14 to 16 are exploded plan views of the optical modulator 12 shown in FIG. 13. In FIGS. 13 to 16, an X axis, a Y axis, and a Z axis are set as three axes orthogonal to one another, and are indicated by arrows. For example, both a plus side direction and a minus side direction of the X axis are referred to as an "X-axis direction". The same applies to a Y-axis direction and a Z-axis direction.

Hereinafter, the third embodiment will be described, and in the following description, differences from the first embodiment will be mainly described, and description of similar matters will be omitted. In the drawings, the same components as those of the first embodiment are denoted by the same reference numerals.

The laser interferometer 1 according to the third embodiment is the same as the laser interferometer 1 according to the first embodiment except that configurations of a vibration element 30B shown in FIGS. 13 to 16 and a correction circuit 56B shown in FIG. 12 are different.

In the laser interferometer 1 according to the third embodiment, the vibration element 30B is used not only for frequency modulation of the emission light L1, but also has a function as an atmospheric pressure sensor. When an atmospheric pressure around the laser interferometer 1 changes, a pressing force acting on the vibration element 30B changes accordingly, a resonance frequency of the vibration element 30B changes, and the atmospheric pressure is obtained from a change amount. The correction circuit 56B corrects a light reception signal based on the atmospheric pressure.

3.1. Vibration Element

The optical modulator 12 shown in FIG. 13 includes a vibration portion forming layer 343 having the vibration element 30B. The vibration element 30B is, for example, a double-tuning fork type quartz crystal vibrator.

The optical modulator 12 shown in FIG. 13 includes a package 340. The package 340 includes a base 341, a lid 342, and a frame portion 371 included in the vibration portion forming layer 343, and has a cavity 345 therein. The vibration element 30B is accommodated in the cavity 345 of the package 340.

The base 341 includes a frame portion 351, a diaphragm portion 352, and two placement portions 353 and 353. The frame portion 351 has a frame shape. The diaphragm portion 352 is disposed inside the frame portion 351, is thinner than the frame portion 351, and has flexibility. The two placement portions 353 and 353 are disposed on the diaphragm portion 352 so as to be aligned along the Y axis, and have a protruding shape protruding toward the vibration element 30B.

The lid 342 includes a frame portion 361 and a thin portion 362. The frame portion 361 has a frame shape. The thin portion 362 is thinner than the frame portion 361 and produces a space necessary for the cavity 345.

Examples of constituent materials of the base 341 and the lid 342 include a metal material, a glass material, and a crystal material. Among these, quartz crystal is preferably used. When the base 341 and the lid 342 are made of quartz crystal, a main material of the entire optical modulator 12 can be made of quartz crystal. Accordingly, manufacturing efficiency of the optical modulator 12 can be increased, and the cost can be reduced. Since quartz crystal has optical transparency, it is possible to set an optical path such that the light transmits through the package 340 as an optical path for allowing the emission light L1 to enter.

The vibration portion forming layer 343 includes the vibration element 30B, the frame portion 371, and a coupling portion 372. The vibration element 30B includes a quartz crystal element including two vibrating beam portions 373 and 374, an electrode which is not shown, and a light reflecting surface 375. The quartz crystal element is manufactured by processing an X cut quartz crystal plate, for example, and has a double-tuning fork type.

The frame portion 371 has a frame shape and is disposed so as to surround the vibration element 30B with a gap therebetween. Each end portion of the vibration element 30B in the Y-axis direction is coupled to the frame portion 371 via the coupling portion 372.

The base 341, the lid 342, and the vibration portion forming layer 343 are bonded to one another by, for example, an adhesive or direct bonding. Accordingly, the vibration element 30B accommodated in the cavity 345 can be hermetically sealed. Accordingly, the cavity 345 can be maintained in a state of being depressurized, or can be maintained in a state of being filled with various gases. As shown in FIG. 13, the two placement portions 353 and 353 are disposed at positions where the two placement portions 353 and 353 press the vibration element 30B by the adhesion.

The electrode is provided on a surface of the quartz crystal element. When an AC voltage is applied to the electrode, the vibrating beam portions 373 and 374 are bent so as to repeatedly separate from and approach each other. Accordingly, the vibrating beam portions 373 and 374 are bent and vibrated in the X-axis direction.

The light reflecting surface 375 is provided on a surface parallel to an X-Y plane of the vibrating beam portion 373, and has a function of reflecting the emission light L1. The light reflecting surface 375 may be a surface of an electrode, which is not shown, provided on the surface, or may be a surface of a light reflecting film provided separately from the electrode.

When the vibrating beam portions 373 and 374 are bent and vibrated in the X-axis direction, the light reflecting surface 375 is also vibrated in the X-axis direction. Such bending vibration in the X-axis direction is referred to as in-plane vibration.

On the other hand, when the in-plane vibration is generated in the vibrating beam portions 373 and 374, at the same time, Z-reverse-phase spurious vibration that vibrates the light reflecting surface 375 in the Z-axis direction is excited. The Z-reverse-phase spurious vibration is an example of out-of-plane vibration.

Such out-of-plane vibration is excited by energetically coupling with the in-plane vibration. Normally, the out-of-plane vibration coupled to the in-plane vibration is avoided or prevented. However, in the embodiment, the out-of-plane vibration is actively excited to cause the light reflecting surface 375 to interact with the frequency of the emission light L1. In order to couple the out-of-plane vibration to the in-plane vibration, a shape of the vibration element 30B, an arrangement of the electrode, which is not shown, and the like may be adjusted. For example, when a cross-sectional shape of the vibrating beam portions 373 and 374 is changed from a rectangular shape to a parallelogram shape, the out-of-plane vibration is easily excited.

When the emission light L1 is incident on the light reflecting surface 375 in a state in which such out-of-plane vibration is generated, interaction occurs between the vibration of the light reflecting surface 375 and the frequency of the emission light L1. Accordingly, it is possible to implement the optical modulator 12 that performs the frequency modulation of the emission light L1. As a result, the reference light L2 can be generated from the emission light L1. Therefore, the optical modulator 12 including the vibration element 30B shown in FIG. 13 is installed such that the Z axis in FIG. 13 and the a axis in FIG. 2 are parallel to each other.

A length of the vibration element 30B in the Y-axis direction is, for example, about 0.2 mm or more and 5.0 mm or less. A thickness of the vibration element 30B in the Z-axis direction is, for example, about 0.003 mm or more and 0.5 mm or less.

The vibration element 30B may be a vibration element having a vibration mode other than the bending vibration.

The vibration element 30B is used not only for the frequency modulation of the emission light L1, but also has a function as an atmospheric pressure sensor.

For example, when the atmospheric pressure around the optical modulator 12 increases in a state in which the vibrating beam portions 373 and 374 are bent and vibrated in the X-axis direction, a pressing force is applied in a direction of an arrow 376 shown in FIG. 13. Accordingly, the diaphragm portion 352 is bent, and a distance between the two placement portions 353 and 353 increases. As a result, a stress changes in the vibration element 30B pressed by the two placement portions 353 and 353. When the stress changes, a resonance frequency of the vibration element 30B changes as compared with that before the change. By detecting the change in the resonance frequency, the pressing force can be detected and the atmospheric pressure can be obtained. Accordingly, the vibration element 30B can function as an atmospheric pressure sensor.

The correction circuit 56B to be described later corrects the light reception signal based on the atmospheric pressure obtained from the pressing force. Accordingly, the displacement and the speed of the object 14 are measured with higher accuracy.

When the displacement of the object 14 is measured by the laser interferometer 1, a measurement error $\Delta d$ is represented by the following formula (I).

$$\Delta d = \frac{\lambda \Delta \phi}{4\pi n} + d\left(\frac{\Delta \lambda}{\lambda} + \frac{\Delta n}{n}\right) \tag{I}$$

$\lambda$: Wavelength of emission light L1

$\Delta \phi$: Phase of sample signal $n$: Air refractive index $d$: Geometric distance $\Delta \lambda$: Wavelength fluctuation of emission light L1

$\Delta n$: fluctuation of air refractive index

A third term on the right side of the above formula (I) includes a fluctuation $\Delta n$ of an air refractive index. The fluctuation of the air refractive index is generally about 0.3 ppm per 1 hPa. When a geometric distance d, that is, a physical distance from the laser interferometer 1 to the object 14 is assumed to be 10 cm, the third term on the right side is about 0.03 ppm per 1 hPa. Then, the measurement accuracy $\Delta d$ is about 30 nm per 1 hPa.

The measurement error of this level may be a significant error in the laser interferometer 1. In the embodiment, even when a change in the atmospheric pressure as a disturbance is applied to the laser interferometer 1, a measurement result of the object 14 is corrected. Accordingly, the displacement and the speed of the object 14 are measured with higher accuracy.

Examples of a situation in which the change in the atmospheric pressure is applied to the laser interferometer 1 include a situation in which an altitude of an installation location changes as an installation location of the laser interferometer 1 is moved. For example, when there is an altitude difference of 1000 m, a difference in atmospheric pressure reaches 100 hPa. Then, when the physical distance from the laser interferometer 1 to the object 14 is assumed to be 10 cm, a difference between measurement results is about 3 μm. Therefore, it is useful to correct the measurement result of the object 14 based on the change in the atmospheric pressure.

When the vibration element 30B is, for example, a double-tuning fork type quartz crystal vibrator, a resolution of the detected atmospheric pressure is, for example, 0.05 Pa. Then, it can be said that the vibration element 30B has a resolution of atmospheric pressure detection sufficient to correct the light reception signal based on a small change in the atmospheric pressure.

The vibration element 30B is not limited to the double-tuning fork type quartz crystal vibrator, and may be, for example, various quartz crystal vibrators such as a tuning fork type quartz crystal vibrator, a quartz crystal AT vibrator, a longitudinal quartz crystal vibrator, and a surface acoustic wave (SAW) resonator.

The vibration element 30B is not limited to a quartz crystal vibrator, and may be a silicon vibrator or a ceramic vibrator. By using a self-excited oscillation vibrator as the vibration element 30B, a modulation signal can be stabilized, and the oscillation circuit 54 operating with the vibration element 30B as a signal source can output the reference signal Ss having higher accuracy.

3.2. Correction Circuit

The correction circuit 56B shown in FIG. 12 detects a pressing force, which is a force acting on the vibration element 30B, from a change in the vibration of the vibration element 30B, and corrects the light reception signal based on a temporal change in an atmospheric pressure obtained from the pressing force. In the embodiment, the correction circuit 56B sequentially reads a frequency value of the reference signal Ss output from the oscillation circuit 54 that operates using the vibration element 30B as a signal source. Next, the correction circuit 56B detects a change in the resonance frequency of the vibration element 30B from a change in the frequency value, and obtains a temporal change in the atmospheric pressure from a change amount. Then, the correction circuit 56B corrects the light reception signal based on the temporal change of the atmospheric pressure. Accordingly, even when the change in the atmospheric pressure as the disturbance is applied to the laser interferometer 1, the influence of the disturbance can be removed from the measurement result of the object 14 or the influence of the disturbance can be reduced. As a result, the displacement and the speed of the object 14 are measured with higher accuracy.

The correction circuit 56B shown in FIG. 12 includes a frequency counter 591, a pressure converter 592, a sensitivity adjustment unit 593, and a subtractor 594.

The frequency counter 591 measures a frequency of the reference signal Ss output from the ADC 533.

The pressure converter 592 performs calculation on the frequency of the reference signal Ss measured by the frequency counter 591, and calculates an atmospheric pressure applied to the vibration element 30B. Accordingly, an atmospheric pressure time signal Xp(t) representing a temporal change of the atmospheric pressure applied to the vibration element 30B is output from the pressure converter 592.

The sensitivity adjustment unit 593 adjusts a detection sensitivity of the atmospheric pressure. Accordingly, an amplitude of the atmospheric pressure time signal Xp(t) output from the pressure converter 592 is adjusted.

The subtractor 594 performs a subtraction processing of subtracting the atmospheric pressure time signal Xp(t) from the demodulated displacement time signal Xd(t). Accordingly, the corrected displacement time signal Xr(t) is obtained. Since the corrected displacement time signal Xr(t) is designed to reduce the influence of disturbance as compared with the demodulated displacement time signal Xd(t), the measurement accuracy of the corrected displacement time signal Xr(t) is improved as compared with the case where the correction is not performed.

The configuration of the correction circuit 56B is not limited to the above. The correction circuit 56B may be, for example, a circuit including a reciprocating counter or a circuit including a $\Delta\Sigma$ converter. Depending on the configuration of the correction circuit 56B, the analog signal output from the oscillation circuit 54 may be input to the correction circuit 56B.

When a signal generator such as a function generator or a signal generator is used instead of the oscillation circuit 54, an atmospheric pressure time signal may be acquired through a path different from that of the reference signal Ss, and may be subjected to the correction processing.

On the other hand, when the oscillation circuit 54 is used, the change in the atmospheric pressure can be detected from the reference signal Ss. Accordingly, since the circuit configuration of the correction circuit 56B is simplified, the cost of the laser interferometer 1 can be easily reduced.

3.3. Effects of Third Embodiment

As described above, the laser interferometer 1 according to the embodiment includes the laser light source 2, the optical modulator 12, the light receiving element 10, the demodulation circuit 52, and the correction circuit 56B.

The laser light source 2 emits the emission light L1 (first laser light). The optical modulator 12 includes the vibration element 30B, modulates the emission light L1 by using the vibration element 30B, and generates the reference light L2 (second laser light) including a modulation signal. The light receiving element 10 receives the object light L3 (third laser light) including a sample signal generated by the emission light L1 being reflected by the object 14, and the reference light L2, and outputs a light reception signal. The demodulation circuit 52 demodulates the sample signal from the light reception signal. The correction circuit 56B detects a pressing force as a force acting on the vibration element 30B from a change in the vibration of the vibration element 30B, and corrects the demodulation displacement time signal Xd(t) (corrects the light reception signal) based on the pressing force.

According to such a configuration, even when the change in the atmospheric pressure as the disturbance is applied to the laser interferometer 1, the influence of the disturbance can be removed from the measurement result of the object 14 or the influence of the disturbance can be reduced. Accordingly, the laser interferometer 1 capable of measuring the displacement and the speed of the object 14 with higher accuracy can be implemented. The vibration element 30B has a fairly small volume, and electric power required for the oscillation is also small. Therefore, it is possible to easily reduce the size of the laser interferometer 1. Further, the vibration element 30B can be used not only for the frequency modulation of the emission light L1, but also can function as an atmospheric pressure sensor. Therefore, the correction processing as described above can be performed without newly providing an atmospheric pressure sensor. Therefore, it is possible to further reduce the size and the cost of the laser interferometer 1 while achieving high accuracy of the laser interferometer 1.

The correction circuit 56B detects the pressing force as a force acting on the vibration element 30B according to the atmospheric pressure.

Accordingly, for example, the change in the atmospheric pressure applied to the laser interferometer 1 can be detected, and the correction processing can be performed. As a result, the influence of the change in the atmospheric pressure can be accurately corrected. The laser interferometer 1 having excellent resistance to the disturbance such as the change in the atmospheric pressure can be implemented.

In the third embodiment as described above, the same effects as those of the first embodiment can also be obtained.

4. Modifications of Optical System

Next, first to fourth modifications of the optical system 50 will be described.

Figure 19:
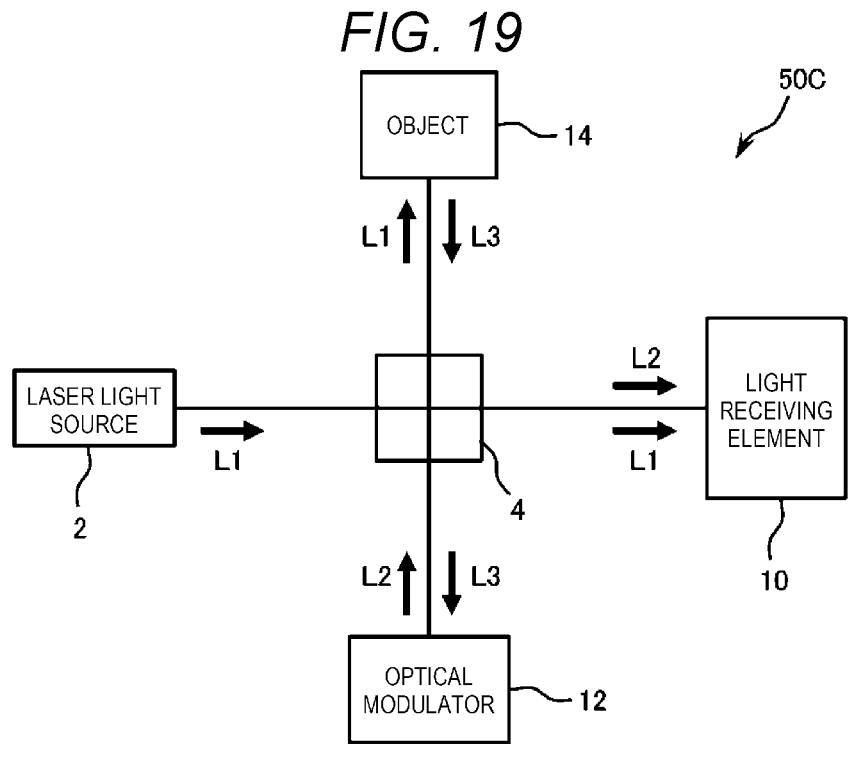
FIG. 19 is a schematic configuration diagram showing an optical system according to a third modification.
Figure 20:
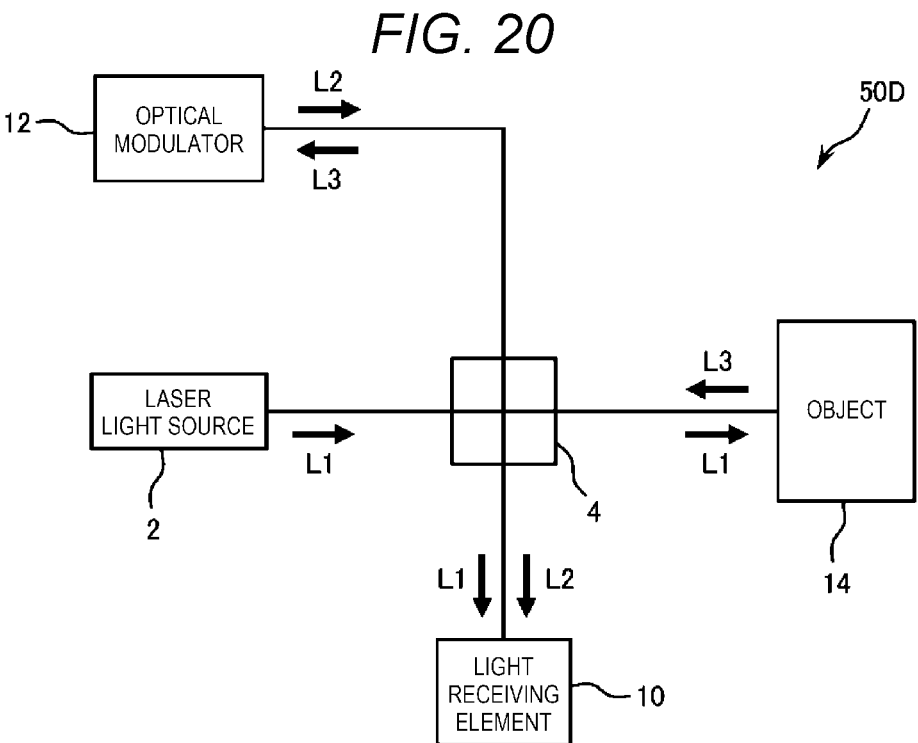
FIG. 20 is a schematic configuration diagram showing an optical system according to a fourth modification.

FIG. 17 is a schematic configuration diagram showing an optical system 50A according to a first modification. FIG. 18 is a schematic configuration diagram showing an optical system 50B according to a second modification. FIG. 19 is a schematic configuration diagram showing an optical system 50C according to a third modification. FIG. 20 is a schematic configuration diagram showing an optical system 50D according to a fourth modification.

Hereinafter, the first to fourth modifications of the optical system 50 will be described. In the following description, differences from the optical system 50 described above will be mainly described, and a description of the same matters will be omitted. In FIGS. 17 to 20, the same components as those in FIG. 2 are denoted by the same reference signs. In FIGS. 17 to 20, a part of the optical elements are not shown.

The optical system 50A shown in FIG. 17 is the same as the optical system 50 shown in FIG. 2 except that light incident on the light receiving element 10, the optical modulator 12, and the object 14 is different. Specifically, in the optical system 50A shown in FIG. 17, the emission light L1 (first laser light) is incident on the light receiving element 10 and the optical modulator 12. The optical modulator 12 shown in FIG. 17 modulates the emission light L1 to generate the reference light L2 (second laser light) including a modulation signal. Subsequently, the reference light L2 is incident on the object 14. Then, the object light L3 (third laser light), which includes a sample signal generated by the reference light L2 being reflected by the object 14, is incident on the light receiving element 10. Therefore, the light receiving element 10 shown in FIG. 17 receives the object light L3 including the sample signal and the modulation signal, and the emission light L1.

The optical system 50B shown in FIG. 18 is the same as the optical system 50A shown in FIG. 17 except that arrangement of the light receiving element 10, the optical modulator 12, and the object 14 is different.

A laser interferometer including the above-described optical systems 50A and 50B according to the first and second modifications includes the laser light source 2, the optical modulator 12, the light receiving element 10, and a demodulation circuit and an oscillation circuit, which are not shown in FIGS. 17 and 18. The laser light source 2 emits the emission light L1 (first laser light). The optical modulator 12 includes the vibration element, modulates the emission light L1 by using the vibration element, and generates the reference light L2 (second laser light) including a modulation signal. The light receiving element 10 receives the object light L3 (third laser light) and the emission light L1, and outputs a light reception signal. The object light L3 includes the modulation signal and a sample signal that is generated by the reference light L2 being reflected by the object 14. The demodulation circuit demodulates the sample signal from the light reception signal. The correction circuit detects a force acting on the vibration element from a change in vibration of the vibration element, and corrects the light reception signal based on the force.

According to such a configuration, the same effects as those of the above-described embodiments can be obtained. That is, even when a disturbance is applied to the laser interferometer, the influence of the disturbance can be removed from the measurement result of the object 14, or the influence of the disturbance can be reduced. Accordingly, the laser interferometer capable of measuring the displacement and the speed of the object 14 with higher accuracy can be implemented.

The optical system 50C shown in FIG. 19 is the same as the optical system 50A shown in FIG. 17, except that arrangement of the optical modulator 12 and the object 14 is different, and that light incident on the light receiving element 10, the optical modulator 12, and the object 14 is different. Specifically, in the optical system 50C shown in FIG. 19, the emission light L1 (first laser light) is incident on the light receiving element 10 and the object 14. When the emission light L1 is reflected by the object 14, the object light L3 (third laser light) including a sample signal is generated. Subsequently, the object light L3 is incident on the optical modulator 12. The optical modulator 12 shown in FIG. 19 modulates the object light L3 to generate the reference light L2 (second laser light) including both a sample signal and a modulation signal. The reference light L2 is incident on the light receiving element 10. Therefore, the light receiving element 10 shown in FIG. 19 receives the reference light L2 including the sample signal and the modulation signal, and the emission light L1.

The optical system 50D shown in FIG. 20 is the same as the optical system 50C shown in FIG. 19 except that arrangement of the light receiving element 10, the optical modulator 12, and the object 14 is different.

A laser interferometer including the above-described optical systems 50C and 50D according to the third and fourth modifications includes the laser light source 2, the optical modulator 12, the light receiving element 10, and a demodulation circuit and an oscillation circuit, which are not shown in FIGS. 19 and 20. The laser light source 2 emits the emission light L1 (first laser light). The optical modulator 12 includes a vibration element, and uses the vibration element to modulate the object light L3 including a sample signal generated by the emission light L1 being reflected by the object 14 and generate the reference light L2 (second laser light) including the sample signal and the modulation signal. The light receiving element 10 receives the reference light L2 including the sample signal and the modulation signal, and the emission light L1, and outputs a light reception signal. The demodulation circuit demodulates the sample signal from the light reception signal. The correction circuit detects a force acting on the vibration element from a change in vibration of the vibration element, and corrects the light reception signal based on the force.

According to such a configuration, the same effects as those of the above-described embodiments can be obtained. That is, even when a disturbance is applied to the laser interferometer, the influence of the disturbance can be removed from the measurement result of the object 14, or the influence of the disturbance can be reduced. Accordingly, the laser interferometer capable of measuring the displacement and the speed of the object 14 with higher accuracy can be implemented.

Although a laser interferometer according to an aspect of the present disclosure has been described above based on the shown embodiments and modifications, the laser interferometer according to the aspect of the present disclosure is not limited to the above-described embodiment and the modifications. A configuration of each part can be replaced with a configuration having the same function. Further, any other components may be added to the laser interferometer according to the above-described embodiment and the modifications.

The laser interferometer according to the present disclosure can be applied to, for example, a vibrometer, an inclinometer, and a distance meter (length measuring device), in addition to the displacement meter or the speedometer described above. Examples of application of the laser interferometer according to an aspect of the present disclosure include an optical comb interference measurement technique that enables distance measurement, 3D imaging, spectroscopy, and the like, and an optical fiber gyro that implements an angular velocity sensor, an angular acceleration sensor, and the like.

Two or more of the laser light source, the optical modulator, and the light receiving element may be mounted on the same substrate. Accordingly, a size and a weight of the optical system can be easily reduced, and assembling of the optical system can be made easier.

Further, although the embodiment and modifications described above include a so-called Michelson interference optical system, the laser interferometer according to an aspect of the present disclosure can also be applied as one having an interference optical system of another type such as a Mach-Zehnder interference optical system.

What is claimed is:

1. A laser interferometer comprising:
a laser light source configured to emit first laser light;
an optical modulator including a vibration element and configured to modulate the first laser light using the vibration element and generate second laser light including a modulation signal;
a light receiving element configured to receive third laser light including a sample signal generated by the first laser light being reflected by an object and the second laser light, and output a light reception signal;
a demodulation circuit configured to demodulate the sample signal from the light reception signal; and
a correction circuit configured to detect a force acting on the vibration element from a change in vibration of the vibration element and correct the light reception signal based on the force.

2. A laser interferometer comprising:
a laser light source configured to emit first laser light;
an optical modulator including a vibration element and configured to modulate the first laser light using the vibration element and generate second laser light including a modulation signal;
a light receiving element configured to receive third laser light and the first laser light, and output a light reception signal, the third laser light including the modulation signal and a sample signal that is generated by the second laser light being reflected by an object;
a demodulation circuit configured to demodulate the sample signal from the light reception signal; and
a correction circuit configured to detect a force acting on the vibration element from a change in vibration of the vibration element and correct the light reception signal based on the force.

3. A laser interferometer comprising:
a laser light source configured to emit first laser light;
an optical modulator including a vibration element and configured to modulate, using the vibration element, third laser light including a sample signal generated by the first laser light being reflected by an object, and generate second laser light including the sample signal and a modulation signal;
a light receiving element configured to receive the second laser light, which includes the sample signal and the modulation signal, and the first laser light, and output a light reception signal;
a demodulation circuit configured to demodulate the sample signal from the light reception signal; and
a correction circuit configured to detect a force acting on the vibration element from a change in vibration of the vibration element and correct the light reception signal based on the force.

4. The laser interferometer according to claim 1, wherein the correction circuit detects an inertial force acting on the vibration element as the force in accordance with an acceleration.

5. The laser interferometer according to claim 2, wherein the correction circuit detects an inertial force acting on the vibration element as the force in accordance with an acceleration.

6. The laser interferometer according to claim 3, wherein the correction circuit detects an inertial force acting on the vibration element as the force in accordance with an acceleration.

7. The laser interferometer according to claim 4, wherein when a linear axis corresponding to a direction of the acceleration when the inertial force acts on the vibration element is defined as an acceleration detection axis, the acceleration detection axis is parallel to an incident optical axis of the first laser light incident on the object.

8. The laser interferometer according to claim 1, wherein the correction circuit detects a Coriolis force acting on the vibration element as the force in accordance with an angular velocity.

9. The laser interferometer according to claim 2, wherein the correction circuit detects a Coriolis force acting on the vibration element as the force in accordance with an angular velocity.

10. The laser interferometer according to claim 3, wherein the correction circuit detects a Coriolis force acting on the vibration element as the force in accordance with an angular velocity.

11. The laser interferometer according to claim 8, wherein when a rotation axis corresponding to a direction of the angular velocity when the Coriolis force acts on the vibration element is defined as an angular velocity detection axis,
the angular velocity detection axis is orthogonal to an incident optical axis of the first laser light incident on the object.

12. The laser interferometer according to claim 1, wherein the correction circuit detects a pressing force acting on the vibration element as the force in accordance with an atmospheric pressure.

13. The laser interferometer according to claim 2, wherein the correction circuit detects a pressing force acting on the vibration element as the force in accordance with an atmospheric pressure.

14. The laser interferometer according to claim 3, wherein the correction circuit detects a pressing force acting on the vibration element as the force in accordance with an atmospheric pressure.

15. The laser interferometer according to claim 1, further comprising:
an oscillation circuit configured to operate using the vibration element as a signal source and outputs a reference signal to the demodulation circuit, wherein
the demodulation circuit is configured to demodulate the sample signal from the light reception signal based on the reference signal.

16. The laser interferometer according to claim 2, further comprising:
an oscillation circuit configured to operate using the vibration element as a signal source and outputs a reference signal to the demodulation circuit, wherein
the demodulation circuit is configured to demodulate the sample signal from the light reception signal based on the reference signal.

17. The laser interferometer according to claim 3, further comprising:
an oscillation circuit configured to operate using the vibration element as a signal source and outputs a reference signal to the demodulation circuit, wherein the demodulation circuit is configured to demodulate the sample signal from the light reception signal based on the reference signal.

\* \* \* \* \*